(12) United States Patent
Blondin et al.

(10) Patent No.: US 12,314,520 B2
(45) Date of Patent: May 27, 2025

(54) TOUCH ELECTRODE ARCHITECTURE FOR HIGH-TRANSMITTANCE TOUCH SCREEN

(71) Applicant: Apple Inc., Cupertino, CA (US)

(72) Inventors: Christophe Blondin, Sunnyvale, CA (US); Ashray Vinayak Gogte, Campbell, CA (US); Ricardo A. Peterson, Fremont, CA (US); Warren S. Rieutort-Louis, Cupertino, CA (US); Yuchi Che, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/174,425

(22) Filed: Feb. 24, 2023

(65) Prior Publication Data

US 2023/0297199 A1   Sep. 21, 2023

Related U.S. Application Data

(60) Provisional application No. 63/268,754, filed on Mar. 1, 2022.

(51) Int. Cl.
  *G06F 3/044*  (2006.01)
  *G06F 3/041*  (2006.01)

(52) U.S. Cl.
  CPC .......... *G06F 3/0446* (2019.05); *G06F 3/0416* (2013.01); *G06F 3/0445* (2019.05);
  (Continued)

(58) Field of Classification Search
  CPC .... G06F 3/0443; G06F 3/0448; G06F 3/0446; G06F 3/0416; G06F 3/0445; G06F 3/0412; G06F 2203/04112; G06F 2203/04111
  See application file for complete search history.

(56) References Cited

U.S. PATENT DOCUMENTS

| 8,970,515 B2 | 3/2015 | Moran et al. |
| 9,753,579 B2 | 9/2017 | Johansson et al. |

(Continued)

FOREIGN PATENT DOCUMENTS

| EP | 3125084 B1 | 8/2020 |
| WO | 2007/017485 A2 | 2/2007 |
| WO | 2019/148603 A1 | 8/2019 |

OTHER PUBLICATIONS

Non-Final Office Action received for U.S. Appl. No. 18/450,771, mailed on Jun. 6, 2024, 17 pages.

(Continued)

*Primary Examiner* — Shaheda A Abdin
(74) *Attorney, Agent, or Firm* — Kubota & Basol LLP

(57) ABSTRACT

Touch electrode architecture techniques can be used to reduce or eliminate metal mesh within the one or more high-transmittance regions of a touch screen including one or more high-transmittance regions. In some examples, one or more optical devices can be integrated with a touch screen such that light associated with the one or more optical devices passes through one or more layers of the touch screen. In some such examples, to avoid degrading performance of the optical devices, one or more high-transmittance regions can be used. Additionally or alternatively, in some examples, the high-transmittance can be achieved using touch electrode architecture techniques that use transparent or semi-transparent materials instead of opaque metal mesh within the high-transmittance regions.

20 Claims, 13 Drawing Sheets

(52) U.S. Cl.
CPC .............. *G06F 2203/04111* (2013.01); *G06F 2203/04112* (2013.01)

(56) References Cited

U.S. PATENT DOCUMENTS

| | | |
|---|---|---|
| 9,851,605 B2 | 12/2017 | Watanabe et al. |
| 9,904,432 B2 | 2/2018 | Choi et al. |
| 10,078,406 B2 | 9/2018 | Tanemura et al. |
| 10,884,305 B2 | 1/2021 | Yoshida |
| 10,910,461 B2 | 2/2021 | Lee et al. |
| 10,916,595 B2 | 2/2021 | Park et al. |
| 10,983,652 B2 | 4/2021 | Jung et al. |
| 11,057,554 B2 | 7/2021 | Nakamura et al. |
| 11,158,238 B2 | 10/2021 | Yamashita et al. |
| 11,281,035 B2 | 3/2022 | Jung et al. |
| 11,442,587 B2 | 9/2022 | Song et al. |
| 11,587,991 B2 | 2/2023 | Han et al. |
| 11,604,553 B2 | 3/2023 | Song et al. |
| 2011/0050624 A1* | 3/2011 | Lee .................. G06F 3/045 345/174 |
| 2013/0268900 A1 | 10/2013 | Ferren et al. |
| 2017/0154566 A1 | 6/2017 | Ryoo et al. |
| 2017/0162637 A1 | 6/2017 | Choi et al. |
| 2017/0227804 A1 | 8/2017 | Nagasawa et al. |
| 2017/0235398 A1 | 8/2017 | Choi et al. |
| 2017/0351131 A1 | 12/2017 | Oem et al. |
| 2018/0129111 A1 | 5/2018 | Wu et al. |
| 2018/0157362 A1 | 6/2018 | Kim et al. |
| 2018/0366495 A1 | 12/2018 | Xu et al. |
| 2019/0051670 A1 | 2/2019 | Bei et al. |
| 2019/0123066 A1 | 4/2019 | Zhan et al. |
| 2019/0197949 A1 | 6/2019 | Kim et al. |
| 2019/0362678 A1 | 11/2019 | Shin et al. |
| 2020/0044006 A1 | 2/2020 | Lee et al. |
| 2020/0110298 A1 | 4/2020 | Li et al. |
| 2020/0117034 A1 | 4/2020 | Mn et al. |
| 2020/0127231 A1 | 4/2020 | Yun et al. |
| 2020/0144352 A1 | 5/2020 | Lee et al. |
| 2020/0176542 A1 | 6/2020 | Park et al. |
| 2020/0194721 A1 | 6/2020 | Lee et al. |
| 2020/0227505 A1 | 7/2020 | Kim et al. |
| 2020/0236259 A1 | 7/2020 | Nakamura et al. |
| 2020/0310186 A1 | 10/2020 | Ina et al. |
| 2020/0310595 A1* | 10/2020 | Akhavan Fomani ...................... G06F 3/0444 |
| 2020/0349886 A1 | 11/2020 | Lin et al. |
| 2020/0381486 A1 | 12/2020 | Jeong et al. |
| 2021/0026498 A1* | 1/2021 | Moy ..................... G06F 3/0412 |
| 2021/0193754 A1 | 6/2021 | Han et al. |
| 2021/0231615 A1 | 7/2021 | Munemoto et al. |
| 2021/0240303 A1* | 8/2021 | Blondin ................ G06F 3/0446 |
| 2022/0350446 A1 | 11/2022 | Song et al. |
| 2023/0049317 A1 | 2/2023 | Wang et al. |
| 2023/0083578 A1 | 3/2023 | Choi et al. |
| 2023/0205384 A1 | 6/2023 | Song et al. |
| 2023/0205415 A1 | 6/2023 | Yeo et al. |
| 2023/0209970 A1 | 6/2023 | Zhang et al. |
| 2023/0229255 A1 | 7/2023 | Kim |
| 2023/0280870 A1 | 9/2023 | Kim et al. |
| 2023/0350512 A1 | 11/2023 | Jung et al. |
| 2023/0376153 A1 | 11/2023 | Wu et al. |
| 2024/0077965 A1 | 3/2024 | Shaviv et al. |
| 2024/0077981 A1 | 3/2024 | Gogte et al. |

OTHER PUBLICATIONS

Corrected Notice of Allowability received for U.S. Appl. No. 18/450,771, mailed on Oct. 23, 2024, 2 pages.

Non-Final Office Action received for U.S. Appl. No. 18/459,026, mailed on Sep. 23, 2024, 20 pages.

Notice of Allowance received for U.S. Appl. No. 18/450,771, mailed on Oct. 11, 2024, 10 pages.

* cited by examiner

TOUCH ELECTRODE ARCHITECTURE FOR HIGH-TRANSMITTANCE TOUCH SCREEN

CROSS-REFERENCE TO RELATED APPLICATIONS

This application claims the benefit of U.S. Provisional Application No. 63/268,754, filed Mar. 1, 2022, the content of which is incorporated herein in its entirety for all purposes.

FIELD OF THE DISCLOSURE

This relates generally to touch sensor panels, and more particularly to touch electrode architectures for high-transmittance touch screens or touch screens including high-transmittance regions.

BACKGROUND OF THE DISCLOSURE

Many types of input devices are presently available for performing operations in a computing system, such as buttons or keys, mice, trackballs, joysticks, touch sensor panels, touch screens and the like. Touch screens, in particular, are popular because of their ease and versatility of operation as well as their declining price. Touch screens can include a touch sensor panel, which can be a clear panel with a touch-sensitive surface, and a display device such as a liquid crystal display (LCD), light emitting diode (LED) display or organic light emitting diode (OLED) display that can be positioned partially or fully behind the panel so that the touch-sensitive surface can cover at least a portion of the viewable area of the display device. Touch screens can allow a user to perform various functions by touching the touch sensor panel using a finger, stylus or other object at a location often dictated by a user interface (UI) being displayed by the display device. In general, touch screens can recognize a touch and the position of the touch on the touch sensor panel, and the computing system can then interpret the touch in accordance with the display appearing at the time of the touch, and thereafter can perform one or more actions based on the touch. In the case of some touch sensing systems, a physical touch on the display is not needed to detect a touch. For example, in some capacitive-type touch sensing systems, fringing electrical fields used to detect touch can extend beyond the surface of the display, and objects approaching near the surface may be detected near the surface without actually touching the surface.

Capacitive touch sensor panels can be formed by a matrix of partially or fully transparent or non-transparent conductive plates (e.g., touch electrodes) made of materials such as Indium Tin Oxide (ITO). In some examples, the conductive plates can be formed from other materials including conductive polymers, metal mesh, graphene, nanowires (e.g., silver nanowires) or nanotubes (e.g., carbon nanotubes). It is due in part to their substantial transparency that some capacitive touch sensor panels can be overlaid on a display to form a touch screen, as described above. Some touch screens can be formed by at least partially integrating touch sensing circuitry into a display pixel stack-up (i.e., the stacked material layers forming the display pixels).

BRIEF SUMMARY OF THE DISCLOSURE

This relates generally to touch sensor panels, and more particularly to touch electrode architectures for high-transmittance touch screens or touch screens including high-transmittance regions. In some examples, one or more optical devices can be integrated with a touch screen such that light associated with the one or more optical devices passes through one or more layers of the touch screen. In some such examples, to avoid degrading performance of the optical devices, one or more high-transmittance regions can be used. In some examples, the high-transmittance can be achieved using touch electrode architecture techniques that reduce or eliminate metal mesh within the high-transmittance regions. Additionally or alternatively, the high-transmittance can be achieved using touch electrode architecture techniques that use transparent or semi-transparent materials instead of opaque metal mesh within the high-transmittance regions.

DETAILED DESCRIPTION OF THE DISCLOSURE

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

This relates generally to touch sensor panels, and more particularly to touch electrode architectures for high-transmittance touch screens or touch screens including high-transmittance regions. In some examples, one or more optical devices can be integrated with a touch screen such that light associated with the one or more optical devices passes through one or more layers of the touch screen. In some such examples, to avoid degrading performance of the optical devices, one or more high-transmittance regions can be used. In some examples, the high-transmittance can be achieved using touch electrode architecture techniques that reduce or eliminate metal mesh within the high-transmittance regions. Additionally or alternatively, the high-transmittance can be achieved using touch electrode architecture techniques that use transparent or semi-transparent materials instead of opaque metal mesh within the high-transmittance regions. As described herein, high-transmittance can refer to a transmittance above a threshold level (e.g., above 80% transmittance, above 85% transmittance, above 90% transmittance, above 95% transmittance, above 98% transmittance, etc.)

Figure 1A:
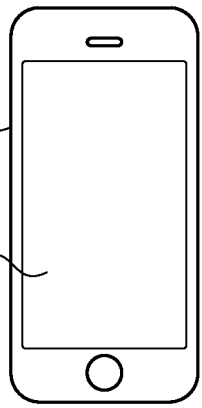
FIGS. 1A-1E illustrate example systems that can include a touch screen according to examples of the disclosure.
Figure 1B:
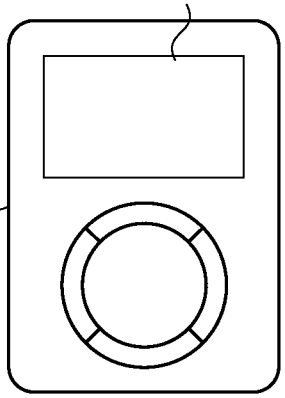
Figure 1C:
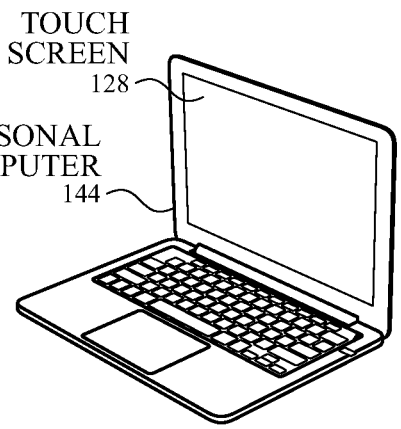
Figure 1D:
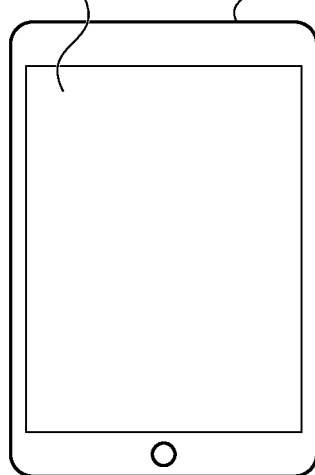
Figure 1E:
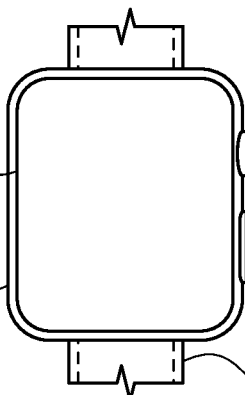

FIGS. 1A-1E illustrate example systems that can include a touch screen according to examples of the disclosure. FIG. 1A illustrates an example mobile telephone 136 that includes a touch screen 124 according to examples of the disclosure. FIG. 1B illustrates an example digital media player 140 that includes a touch screen 126 according to examples of the disclosure. FIG. 1C illustrates an example personal computer 144 that includes a touch screen 128 according to examples of the disclosure. FIG. 1D illustrates an example tablet computing device 148 that includes a touch screen 130 according to examples of the disclosure. FIG. 1E illustrates an example wearable device 150 that includes a touch screen 132 and can be attached to a user using a strap 152 according to examples of the disclosure. It is understood that a touch screen can be implemented in other devices as well.

In some examples, touch screens 124, 126, 128, 130 and 132 can be based on self-capacitance. A self-capacitance based touch system can include a matrix of small, individual plates of conductive material or groups of individual plates of conductive material forming larger conductive regions that can be referred to as touch electrodes or as touch node electrodes (as described below with reference to FIG. 4B). For example, a touch screen can include a plurality of individual touch electrodes, each touch electrode identifying or representing a unique location (e.g., a touch node) on the touch screen at which touch or proximity is to be sensed, and each touch node electrode being electrically isolated from the other touch node electrodes in the touch screen/panel. Such a touch screen can be referred to as a pixelated self-capacitance touch screen, though it is understood that in some examples, the touch node electrodes on the touch screen can be used to perform scans other than self-capacitance scans on the touch screen (e.g., mutual capacitance scans). During operation, a touch node electrode can be stimulated with an alternating current (AC) waveform, and the self-capacitance to ground of the touch node electrode can be measured. As an object approaches the touch node electrode, the self-capacitance to ground of the touch node electrode can change (e.g., increase). This change in the self-capacitance of the touch node electrode can be detected and measured by the touch sensing system to determine the positions of multiple objects when they touch, or come in proximity to, the touch screen. In some examples, the touch node electrodes of a self-capacitance based touch system can be formed from rows and columns of conductive material, and changes in the self-capacitance to ground of the rows and columns can be detected, similar to above. In some examples, a touch screen can be multi-touch, single touch, projection scan, full-imaging multi-touch, capacitive touch, etc.

In some examples, touch screens 124, 126, 128, 130 and 132 can be based on mutual capacitance. A mutual capacitance based touch system can include electrodes arranged as drive and sense lines that may cross over each other on different layers (in a double-sided configuration), or may be adjacent to each other on the same layer (e.g., as described below with reference to FIG. 4A). The crossing or adjacent locations can form touch nodes. During operation, the drive line can be stimulated with an AC waveform and the mutual capacitance of the touch node can be measured. As an object approaches the touch node, the mutual capacitance of the touch node can change (e.g., decrease). This change in the mutual capacitance of the touch node can be detected and measured by the touch sensing system to determine the positions of multiple objects when they touch, or come in proximity to, the touch screen. As described herein, in some examples, a mutual capacitance based touch system can form touch nodes from a matrix of small, individual plates of conductive material.

In some examples, touch screens 124, 126, 128, 130 and 132 can be based on mutual capacitance and/or self-capacitance. The electrodes can be arrange as a matrix of small, individual plates of conductive material (e.g., as in touch node electrodes 408 in touch screen 402 in FIG. 4B) or as drive lines and sense lines (e.g., as in row touch electrodes 404 and column touch electrodes 406 in touch screen 400 in FIG. 4A), or in another pattern. The electrodes can be configurable for mutual capacitance or self-capacitance sensing or a combination of mutual and self-capacitance sensing. For example, in one mode of operation electrodes can be configured to sense mutual capacitance between electrodes and in a different mode of operation electrodes can be configured to sense self-capacitance of electrodes. In some examples, some of the electrodes can be configured to sense mutual capacitance therebetween and some of the electrodes can be configured to sense self-capacitance thereof.

Figure 2:
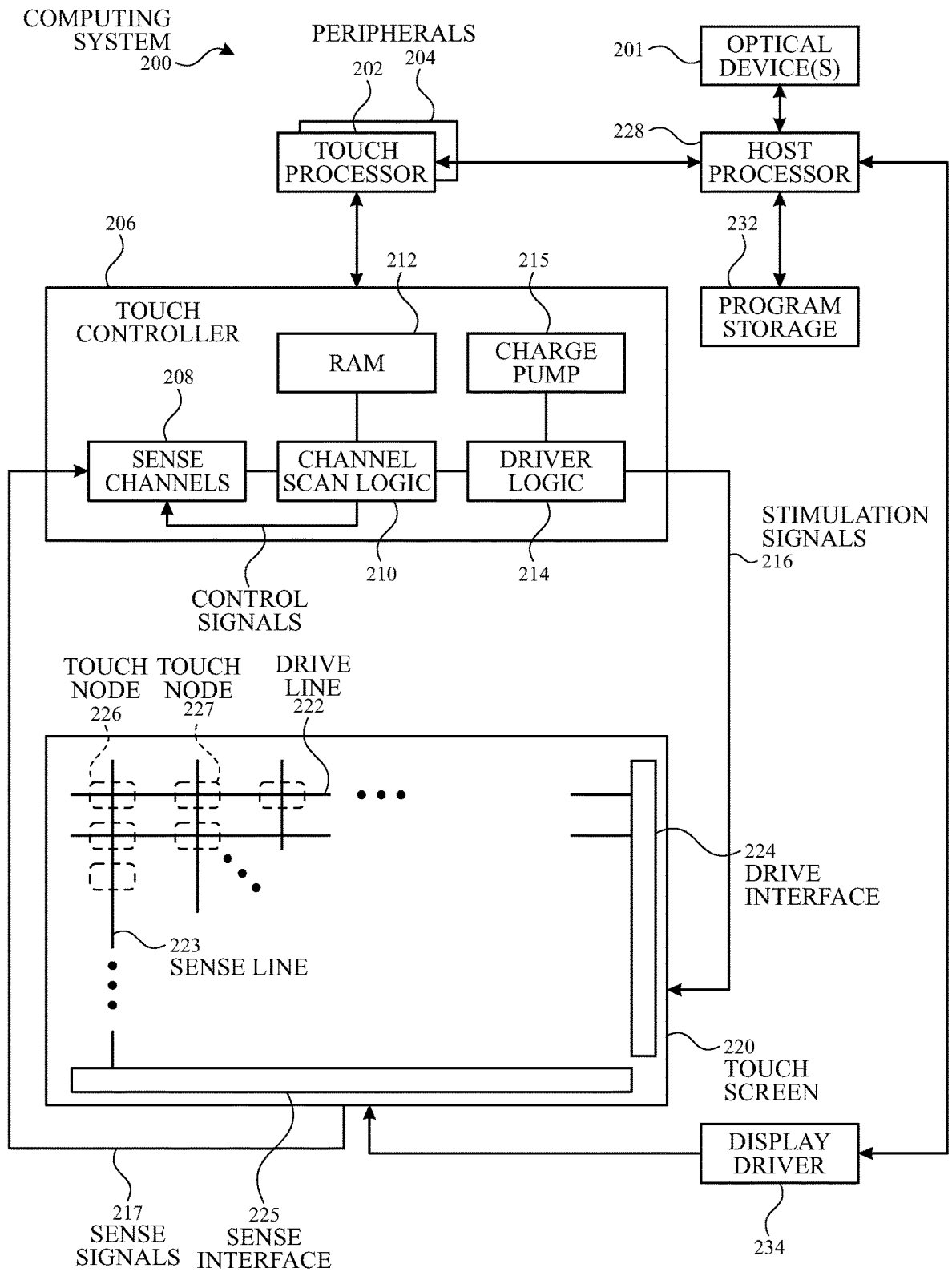
FIG. 2 illustrates an example computing system including a touch screen according to examples of the disclosure.

FIG. 2 illustrates an example computing system including a touch screen according to examples of the disclosure. Computing system 200 can be included in, for example, a mobile phone, tablet, touchpad, portable or desktop computer, portable media player, wearable device or any mobile or non-mobile computing device that includes a touch screen or touch sensor panel. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and/or phases that can be selectively applied to drive regions of the touch sensing circuitry of touch screen 220, as described in more detail below. In some examples, touch controller 206, touch processor 202 and peripherals 204 can be integrated into a single application specific integrated circuit (ASIC), and in some examples can be integrated with touch screen 220 itself.

It should be apparent that the architecture shown in FIG. 2 is only one example architecture of computing system 200, and that the system could have more or fewer components than shown, or a different configuration of components. In some examples, computing system 200 can include an energy storage device (e.g., a battery) to provide a power supply and/or communication circuitry to provide for wired or wireless communication (e.g., cellular, Bluetooth, Wi-Fi, etc.). The various components shown in FIG. 2 can be implemented in hardware, software, firmware or any combination thereof, including one or more signal processing and/or application specific integrated circuits.

Computing system 200 can include a host processor 228 for receiving outputs from touch processor 202 and performing actions based on the outputs. For example, host processor 228 can be connected to program storage 232 and a display controller/driver 234 (e.g., a Liquid-Crystal Display (LCD) driver). It is understood that although some examples of the disclosure may described with reference to LCD displays, the scope of the disclosure is not so limited and can extend to other types of displays, such as Light-Emitting Diode (LED) displays, including Organic LED (OLED), Active-Matrix Organic LED (AMOLED) and Passive-Matrix Organic LED (PMOLED) displays. Display driver 234 can provide voltages on select (e.g., gate) lines to each pixel transistor and can provide data signals along data lines to these same transistors to control the pixel display image.

Host processor 228 can use display driver 234 to generate a display image on touch screen 220, such as a display image of a user interface (UI), and can use touch processor 202 and touch controller 206 to detect a touch on or near touch screen 220, such as a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Note that one or more of the functions described herein can be performed by firmware stored in memory (e.g., one of the peripherals 204 in FIG. 2) and executed by touch processor 202, or stored in program storage 232 and executed by host processor 228. The firmware can also be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium (excluding signals) that can contain or store the program for use by or in connection with the instruction execution system, apparatus, or device. In some examples, RAM 212 or program storage 232 (or both) can be a non-transitory computer readable storage medium. One or both of RAM 212 and program storage 232 can have stored therein instructions, which when executed by touch processor 202 or host processor 228 or both, can cause the device including computing system 200 to perform one or more functions and methods of one or more examples of this disclosure. The computer-readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

The firmware can also be propagated within any transport medium for use by or in connection with an instruction execution system, apparatus, or device, such as a computer-based system, processor-containing system, or other system that can fetch the instructions from the instruction execution system, apparatus, or device and execute the instructions. In the context of this document, a "transport medium" can be any medium that can communicate, propagate or transport the program for use by or in connection with the instruction execution system, apparatus, or device. The transport medium can include, but is not limited to, an electronic, magnetic, optical, electromagnetic or infrared wired or wireless propagation medium.

Touch screen 220 can be used to derive touch information at multiple discrete locations of the touch screen, referred to herein as touch nodes. Touch screen 220 can include touch sensing circuitry that can include a capacitive sensing medium having a plurality of drive lines 222 and a plurality of sense lines 223. It should be noted that the term "lines" is sometimes used herein to mean simply conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 in touch controller 206. In this way, drive lines and sense lines can be part of the touch sensing circuitry that can interact to form capacitive sensing nodes, which can be thought of as touch picture elements (touch pixels) and referred to herein as touch nodes, such as touch nodes 226 and 227. This way of understanding can be particularly useful when touch screen 220 is viewed as capturing an "image" of touch ("touch image"). In other words, after touch controller 206 has determined whether a touch has been detected at each touch nodes in the touch screen, the pattern of touch nodes in the touch screen at which a touch occurred can be thought of as an "image" of touch (e.g., a pattern of fingers touching the touch screen). As used herein, an electrical component "coupled to" or "connected to" another electrical component encompasses a direct or indirect connection providing electrical path for communication or operation between the coupled components. Thus, for example, drive lines 222 may be directly connected to driver logic 214 or indirectly connected to driver logic 214 via drive interface 224 and sense lines 223 may be directly connected to sense channels 208 or indirectly connected to sense channels 208 via sense interface 225. In either case an electrical path for driving and/or sensing the touch nodes can be provided.

In some examples, computing system 200 can also include one or more optical devices 201, which may also be referred to herein as optical components. In some examples, the one or more optical devices 201 can include components for light emitting and/or light sensing. In some examples, the one or more optical devices 201 can include light-emitting diodes (e.g., LEDs, OLEDs, etc.), cameras, lasers (e.g., vertical-cavity surface-emitting lasers, etc.), light detectors, photodiodes, and the like. In some examples, the operation of the optical devices can be controlled by host processor 228 or an optical controller (not shown) to perform functionality using the optical devices. The functionality can include, without limitation, projecting light, imaging, proximity sensing and ranging, ambient light sensing, photography, etc., among other possibilities. In some examples, the one or more optical devices 201 can be implemented in proximity to touch screen 220 (e.g., on a periphery of or a notch region along a perimeter of touch screen 220). As described in more detail herein, in some examples, the one or more optical devices 201 can be integrated with touch screen 220 such that light passes through one or more layers of the touch screen. In some such examples, to avoid degrading performance of the optical devices 201, a high-transmittance touch screen or a touch screen including one or more high-transmittance regions can be used. In some examples, the high-transmittance can be achieved using touch electrode architecture techniques described herein with respect to FIGS. 9-13.

Figure 3A:
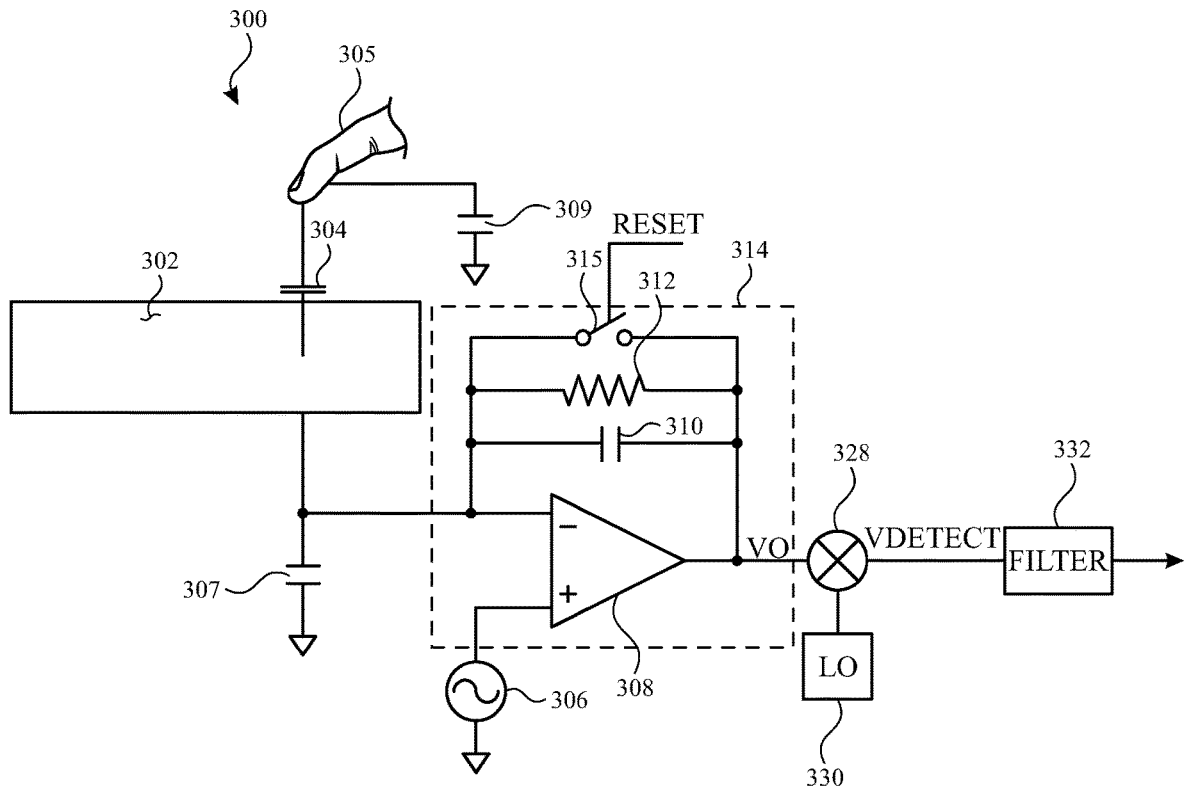
FIG. 3A illustrates an example touch sensor circuit corresponding to a self-capacitance measurement of a touch node electrode and sensing circuit according to examples of the disclosure.

FIG. 3A illustrates an example touch sensor circuit 300 corresponding to a self-capacitance measurement of a touch node electrode 302 and sensing circuit 314 according to examples of the disclosure. Touch node electrode 302 can correspond to a touch electrode 404 or 406 of touch screen 400 or a touch node electrode 408 of touch screen 402. Touch node electrode 302 can have an inherent self-capacitance to ground associated with it, and also an additional self-capacitance to ground that is formed when an object, such as finger 305, is in proximity to or touching the electrode. The total self-capacitance to ground of touch node electrode 302 can be illustrated as capacitance 304. Touch node electrode 302 can be coupled to sensing circuit 314. Sensing circuit 314 can include an operational amplifier 308, feedback resistor 312 and feedback capacitor 310, although other configurations can be employed. For example, feedback resistor 312 can be replaced by a switched capacitor resistor in order to minimize a parasitic capacitance effect that can be caused by a variable feedback resistor. Touch node electrode 302 can be coupled to the inverting input (−) of operational amplifier 308. An AC voltage source 306 ($V_{ac}$) can be coupled to the non-inverting input (+) of operational amplifier 308. Touch sensor circuit 300 can be configured to sense changes (e.g., increases) in the total self-capacitance 304 of the touch node electrode 302 induced by a finger or object either touching or in proximity to the touch sensor panel. Output 320 can be used by a processor to determine the presence of a proximity or touch event, or the output can be inputted into a discrete logic network to determine the presence of a proximity or touch event.

Figure 3B:
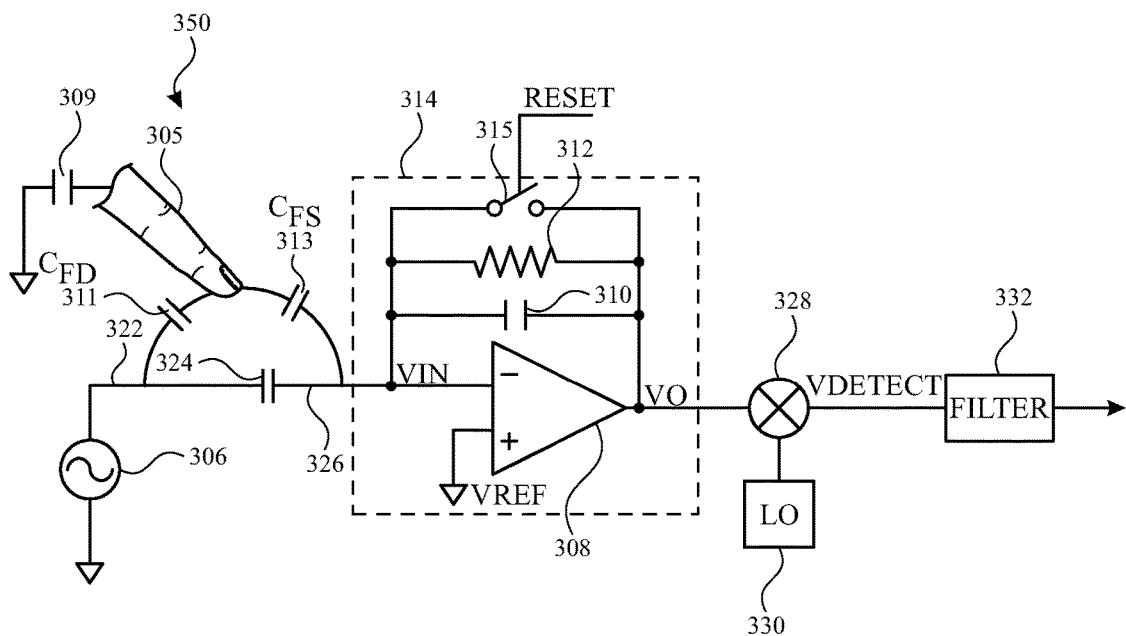
FIG. 3B illustrates an example touch sensor circuit corresponding to a mutual-capacitance drive line and sense line and sensing circuit according to examples of the disclosure.

FIG. 3B illustrates an example touch sensor circuit 350 corresponding to a mutual-capacitance drive line 322 and sense line 326 and sensing circuit 314 according to examples of the disclosure. Drive line 322 can be stimulated by a stimulation signal output from AC voltage source 306 (e.g., an AC voltage signal). The stimulation signal can be capacitively coupled to sense line 326 through mutual capacitance 324 between drive line 322 and the sense line. When an object, such as finger 305, approaches the touch node created by the intersection of drive line 322 and sense line 326, mutual capacitance 324 can change (e.g., decrease). This change in mutual capacitance 324 can be detected to indicate a touch or proximity event at the touch node, as described herein. The sense signal coupled onto sense line 326 can be received by sensing circuit 314. Sensing circuit 314 can include operational amplifier 308 and at least one of a feedback resistor 312 and a feedback capacitor 310. FIG. 3B illustrates a general case in which both resistive and capacitive feedback elements are utilized. The sense signal (referred to as Vin) can be inputted into the inverting input of operational amplifier 308, and the non-inverting input of the operational amplifier can be coupled to a reference voltage $V_{ref}$. Operational amplifier 308 can drive its output to voltage $V_o$ to keep $V_{in}$ substantially equal to $V_{ref}$ and can therefore maintain $V_{in}$ constant or virtually grounded. A person of skill in the art would understand that in this context, equal can include deviations of up to 15%. Therefore, the gain of sensing circuit 314 can be mostly a function of the ratio of mutual capacitance 324 and the feedback impedance, comprised of resistor 312 and/or capacitor 310. The output of sensing circuit 314 Vo can be filtered and heterodyned or homodyned by being fed into multiplier 328, where Vo can be multiplied with local oscillator 330 to produce $V_{detect}$. $V_{detect}$ can be inputted into filter 332. One skilled in the art will recognize that the placement of filter 332 can be varied; thus, the filter can be placed after multiplier 328, as illustrated, or two filters can be employed: one before the multiplier and one after the multiplier. In some examples, there can be no filter at all. The direct current (DC) portion of $V_{detect}$ can be used to determine if a touch or proximity event has occurred. Note that while FIGS. 3A-3B indicate the demodulation at multiplier 328 occurs in the analog domain, output Vo may be digitized by an analog-to-digital converter (ADC), and multiplier 328, filter 332 and oscillator 330 may be implemented in a digital fashion (e.g., multiplier 328 can be a digital demodulator, filter 332 can be a digital filter, and oscillator 330 can be a digital NCO (Numerical Controlled Oscillator).

Referring back to FIG. 2, in some examples, touch screen 220 can be an integrated touch screen in which touch sensing circuit elements of the touch sensing system can be integrated into the display pixel stack-ups of a display. The circuit elements in touch screen 220 can include, for example, elements that can exist in LCD or other displays (LED display, OLED display, etc.), such as one or more pixel transistors (e.g., thin film transistors (TFTs)), gate lines, data lines, pixel electrodes and common electrodes. In a given display pixel, a voltage between a pixel electrode and a common electrode can control a luminance of the display pixel. The voltage on the pixel electrode can be supplied by a data line through a pixel transistor, which can be controlled by a gate line. It is noted that circuit elements are not limited to whole circuit components, such as a whole capacitor, a whole transistor, etc., but can include portions of circuitry, such as only one of the two plates of a parallel plate capacitor. Additionally, as described herein, in some examples, the integrated touch screen can include optical devices and one or more high-transmittance regions corresponding to the optical devices.

Figure 4B:
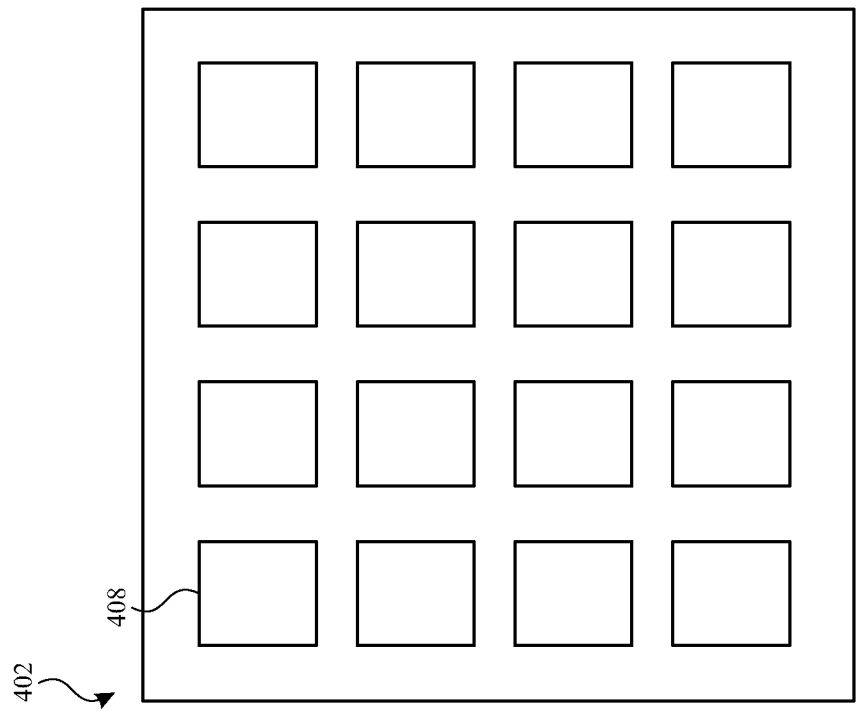
FIG. 4B illustrates touch screen with touch node electrodes arranged in a pixelated touch node electrode configuration according to examples of the disclosure.
Figure 4A:
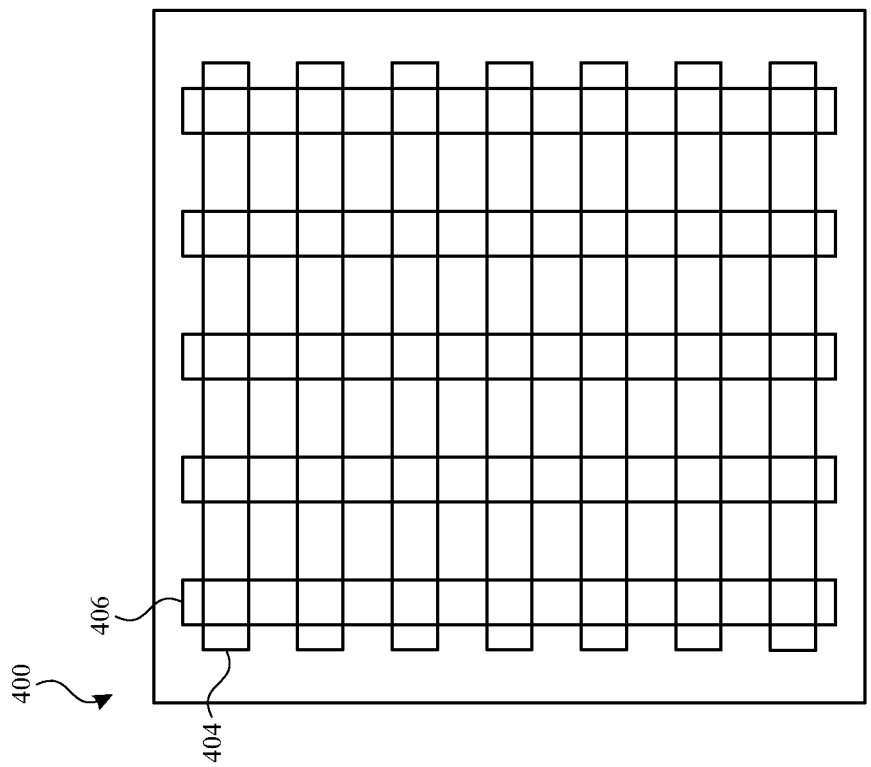
FIG. 4A illustrates touch screen with touch electrodes arranged in rows and columns according to examples of the disclosure.

FIG. 4A illustrates touch screen 400 with touch electrodes 404 and 406 arranged in rows and columns according to examples of the disclosure. Specifically, touch screen 400 can include a plurality of touch electrodes 404 disposed as rows, and a plurality of touch electrodes 406 disposed as columns. Touch electrodes 404 and touch electrodes 406 can be on the same or different material layers on touch screen 400, and can intersect with each other, as illustrated in FIG. 4A. In some examples, the electrodes can be formed on opposite sides of a transparent (partially or fully) substrate and from a transparent (partially or fully) semiconductor material, such as ITO, though other materials are possible. Electrodes displayed on layers on different sides of the substrate can be referred to herein as a double-sided sensor. In some examples, the touch electrodes can be formed on the same layer, and may be referred to herein as a single-sided sensor. In some examples, touch screen 400 can sense the self-capacitance of touch electrodes 404 and 406 to detect touch and/or proximity activity on touch screen 400, and in some examples, touch screen 400 can sense the mutual capacitance between touch electrodes 404 and 406 to detect touch and/or proximity activity on touch screen 400.

FIG. 4B illustrates touch screen 402 with touch node electrodes 408 arranged in a pixelated touch node electrode configuration according to examples of the disclosure. Specifically, touch screen 402 can include a plurality of individual touch node electrodes 408, each touch node electrode identifying or representing a unique location on the touch screen at which touch or proximity (i.e., a touch or proximity event) is to be sensed, and each touch node electrode being electrically isolated from the other touch node electrodes in the touch screen/panel, as previously described. Touch node electrodes 408 can be on the same or different material layers on touch screen 400. In some examples, touch screen 402 can sense the self-capacitance of touch node electrodes 408 to detect touch and/or proximity activity on touch screen 402, and in some examples, touch screen 402 can sense the mutual capacitance between touch node electrodes 408 to detect touch and/or proximity activity on touch screen 402.

Figure 5A:
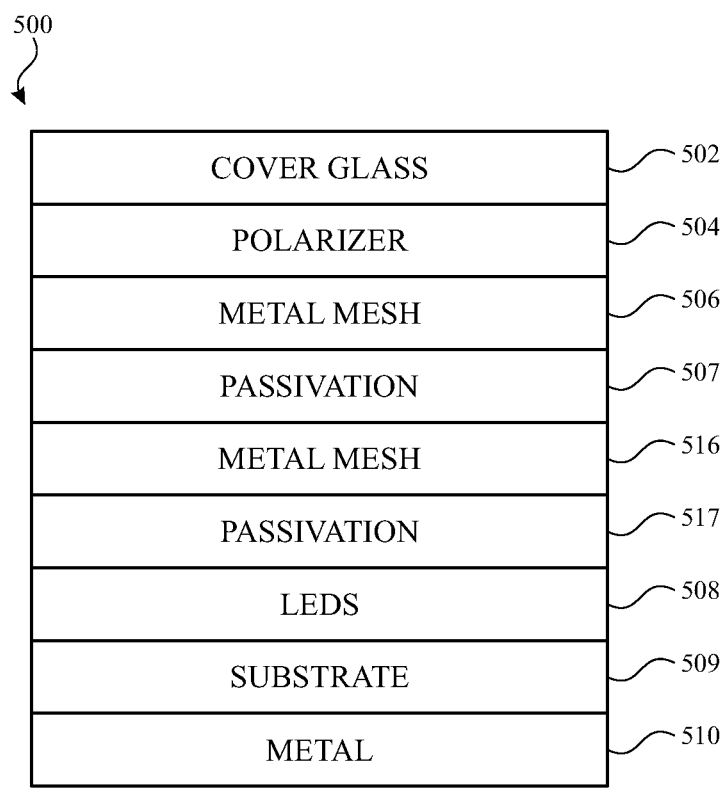
FIG. 5A illustrates an example touch screen stack-up including a metal mesh layer according to examples of the disclosure.

As described herein, in some examples, some or all of the touch electrodes of the touch screen can be formed from a metal mesh. FIG. 5A illustrates an example touch screen stack-up including a metal mesh layer according to examples of the disclosure. Touch screen 500 can include a substrate 509 (e.g., a printed circuit board) upon which display LEDs 508 (optionally OLEDs) can be mounted. In some examples, the LEDs 508 can be partially or fully embedded in substrate 509 (e.g., the components can be placed in depressions in the substrate). Substrate 509 can include routing traces in one or more layers (e.g., represented by metal layer 510 in FIG. 5A) to route the LEDs to display driving circuitry (e.g., display driver 234). The stack-up of touch screen 500 can also include one or more passivation layers deposited over the LEDs 508. For example, the stack-up of touch screen 500 illustrated in FIG. 5A can include a passivation layer 507 (e.g., transparent epoxy) and passivation layer 517. Passivation layers 507 and 517 can planarize the surface for respective metal mesh layers. Additionally, the passivation layers can provide electrical isolation (e.g., between metal mesh layers and between the LEDs and a metal mesh layer). Metal mesh layer 516 (e.g., copper, silver, etc.) can be deposited on the planarized surface of the passivation layer 517 over the display LEDs 508, and metal mesh layer 506 (e.g., copper, silver, etc.) can be deposited on the planarized surface of passivation layer 507. In some examples, the passivation layer 517 can include material to encapsulate the LEDs to protect them from corrosion or other environmental exposure. Metal mesh layer 506 and/or metal mesh layer 516 can include a pattern of conductor material in a mesh pattern described below. In some examples, metal mesh layer 506 and metal mesh layer 516 can be coupled by one or more vias. Additionally, although not shown in FIG. 5A, a border region around the display active area can include metallization (or other conductive material) that may or may not be a metal mesh pattern. In some examples, metal mesh is formed of a non-transparent material, but the metal mesh wires are sufficiently thin and sparse to appear transparent to the human eye. The touch electrodes (and some routing) as described herein can be formed in the metal mesh layer(s) from portions of the metal mesh. In some examples, polarizer 504 can be disposed above the metal mesh layer 506 (optionally with another planarization layer disposed over the metal mesh layer 506). Cover glass (or front crystal) 502 can be disposed over polarizer 504 and form the outer surface of touch screen 500. It is understood that although two metal mesh layers (and two corresponding planarization layers) are illustrated, in some examples more or fewer metal mesh layers (and corresponding planarization layers) can be implemented. Additionally, it is understood that LEDs 508, substrate 509, metal layer 510, and/or passivation layer 517 can be replaced by a thin-film transistor (TFT) LCD display (or other types of displays), in some examples. Additionally, it is understood that polarizer 504 can include one or more transparent layers including a polarizer, adhesive layers (e.g., optically clear adhesive) and protective layers.

Figure 5B:
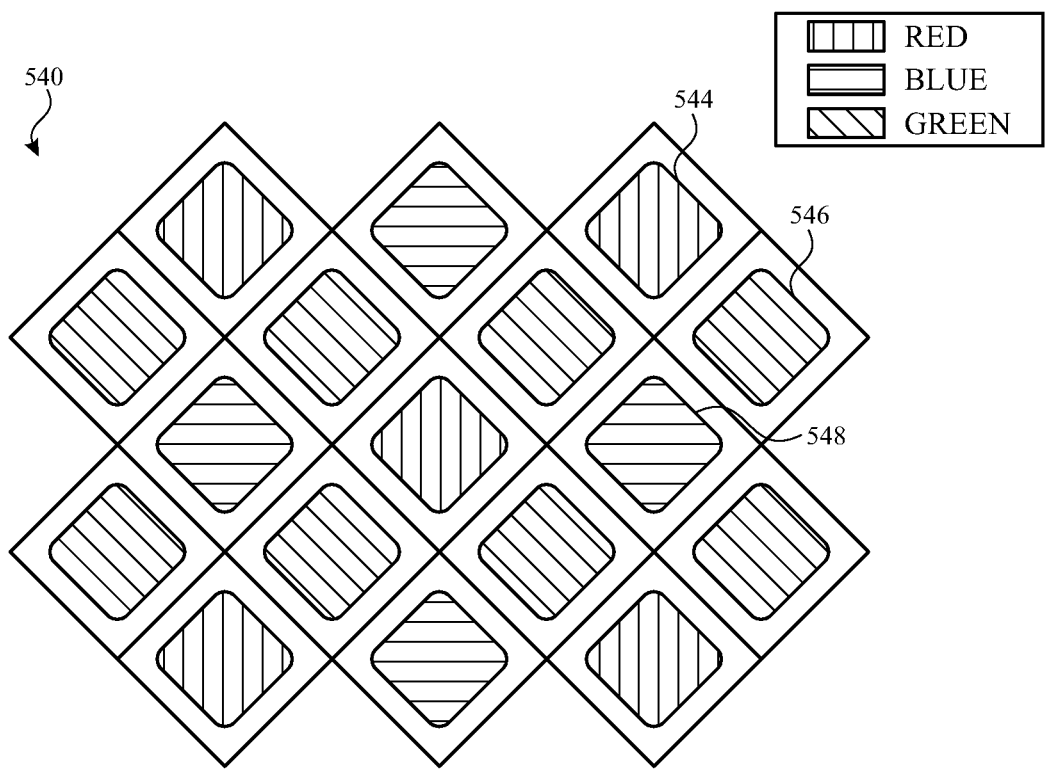
FIG. 5B illustrate a top view of a portion of a touch screen according to examples of the disclosure.

FIG. 5B illustrates a top view of a portion of touch screen 500 in a diamond pattern according to examples of the disclosure. The top view shows metal mesh 540 (e.g., a portion of metal mesh layer 506) together with LEDs 508 of touch screen 500. The LEDs can be arranged in groups of three proximate LEDs, including a red LED (e.g., red LED 544), a green LED (e.g., green LED 546), and a blue LED (e.g., blue LED 548), to form standard red-green-blue (RGB) display pixels. Although primarily described herein in terms of an RGB display pixel, it is understood that other touch pixels are possible with different numbers of LEDs and/or different color LEDs. The metal mesh can be formed of conductors (e.g., metal mesh wires formed from conductive materials such as copper, silver, etc.) disposed in a pattern to allow light to pass (at least vertically) through the gaps in the mesh (e.g., the LEDs 508 can be disposed in the LED layer opposite openings in the metal mesh disposed in the metal mesh layer(s) 506 and/or 516). In other words, the conductors of metal mesh layer can be patterned so that conceptually flattening the metal mesh layer(s) and LEDs into the same layer, the conductors and the LEDs do not overlap. In some examples, the metal mesh wires in the metal mesh layer may overlap (at least partially) some of the LEDs 508, but may be thin enough or sparse enough to not obstruct a human's view of the LEDs. The metal mesh 540 can be formed in a diamond pattern around LEDs arranged in a diamond configuration. The pattern of LEDs forming the display pixels can be repeated across the touch screen to form the display. During fabrication, the metal mesh pattern can repeat across the touch screen to form a touch screen with uniform optical characteristics. It should be understood that the arrangement of LEDs and the corresponding metal mesh are merely an example, and other arrangements of LEDs and corresponding metal mesh patterns are possible. For example, the metal mesh can, in some examples, form a rectangular shape (or other suitable shape including polygonal shapes, etc.) around rectangular-shaped LEDs.

As described herein, the touch electrodes and/or routing can be formed from the metal mesh. To form the electrically isolated touch electrodes or electrically isolated groups of touch electrodes (e.g., groups of touch electrodes forming row electrodes or column electrodes), the metal mesh can be cut (e.g., chemically or laser etched, among other possibilities) to form a boundary between two adjacent touch electrodes, between two adjacent routing traces or between a routing trace and adjacent touch electrode. The cut in the metal mesh can electrically isolate the metal mesh forming a first touch electrode (or first group of touch electrodes) from the metal mesh forming a second touch electrode (or second group of touch electrodes). Similarly, cuts to the metal mesh can be made to electrically isolate the metal mesh forming a first touch electrode from a first routing trace or to electrically isolate the first routing trace from a second routing trace.

Referring back to FIG. 5A, in some examples, although metal mesh layers 506 and 516 are illustrated, it is understood that in some examples, alternative materials can be used in these layers to implement touch electrodes. Additionally, although LEDs 508 are described, it is understood that additional optical components apart from the display pixels (e.g., optical devices 201) can be implemented on substrate 509 (or another layer within the stack-up). Additionally, in some examples, a portion of one or more of metal mesh layers 506 and 516 may be used to implement touch electrodes or portions of one or more touch electrodes with a different material to improve the transmittance in regions corresponding to the optical components.

Figure 6:
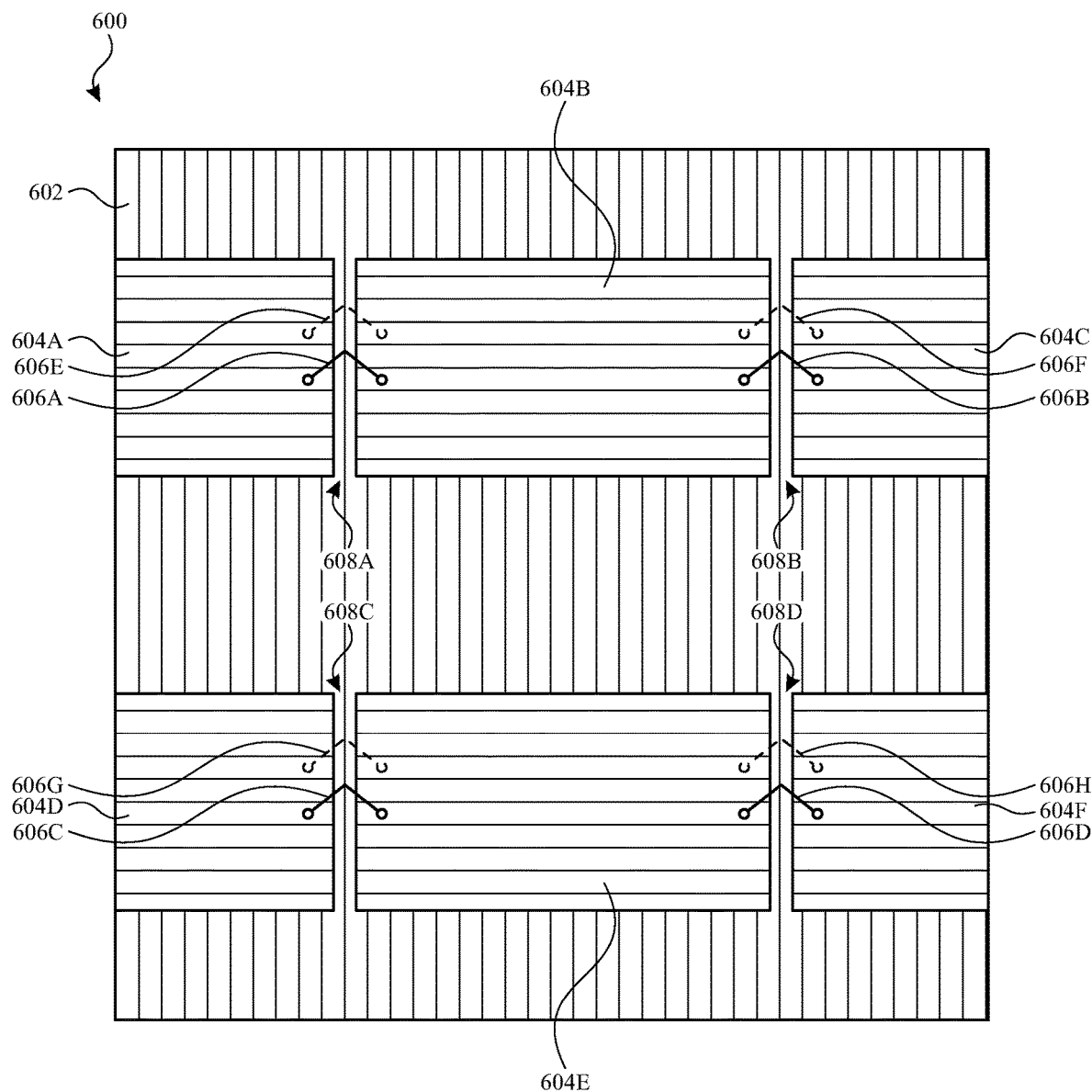
FIG. 6 illustrates an example unit cell that can be repeated across a touch sensor panel to form a bar-and-stripe pattern according to examples of the disclosure.
Figure 7:
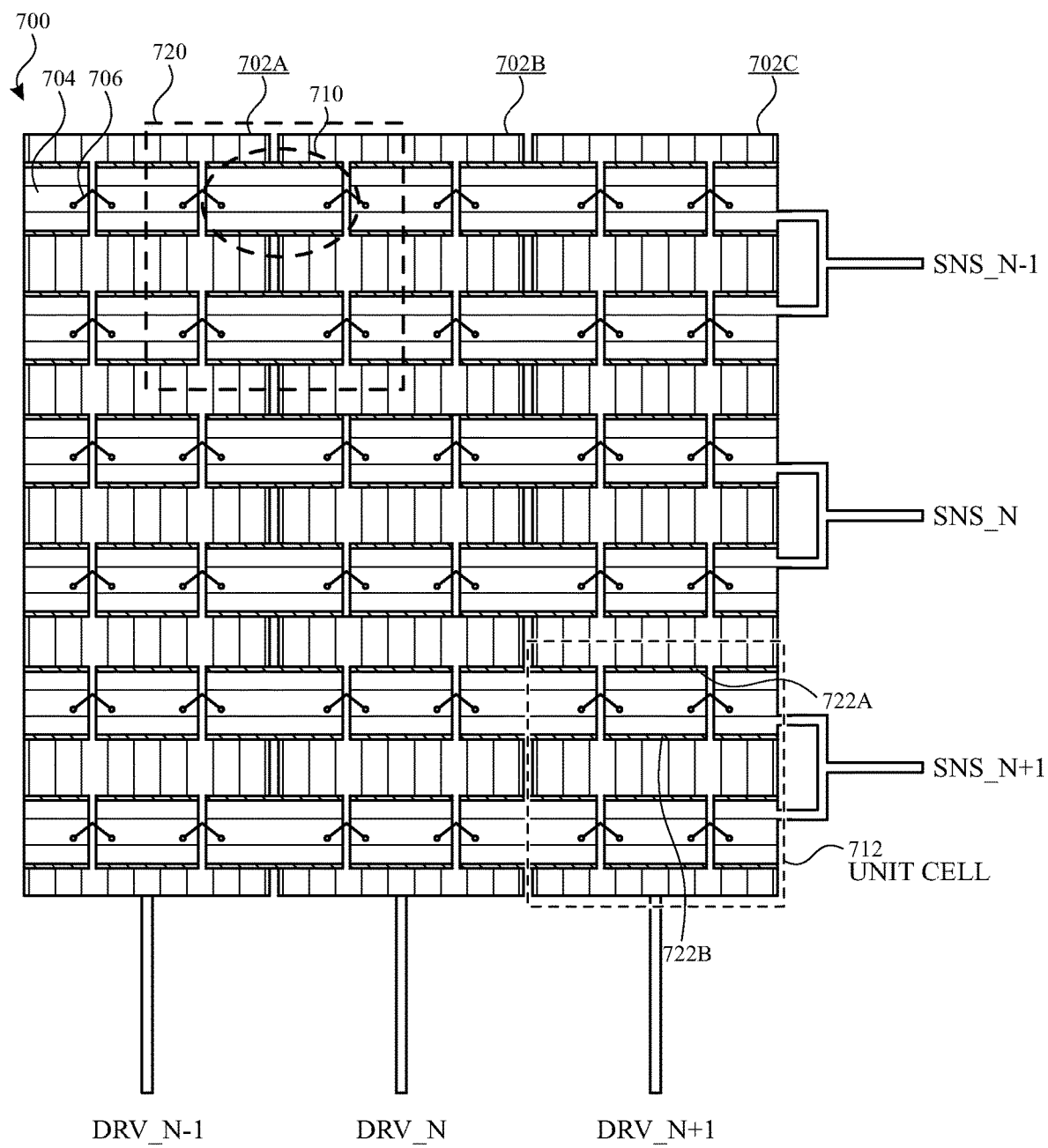
FIG. 7 illustrates an example of a touch sensor panel formed from unit cells according to examples of the disclosure.

As described herein, in some examples, touch electrodes can be arranged in rows and columns formed in a first layer. In some examples, the touch electrodes can be arranged in a bar-and-stripe pattern. The column touch electrodes illustrated in FIGS. 6-7 can be referred to as "bars" and the row touch electrodes can be formed from interconnected touch electrode segments that can be referred to as "stripes" (e.g., interconnected via bridges). FIG. 6 illustrates an example unit cell that can be repeated across a touch sensor panel to form a bar-and-stripe pattern according to examples of the disclosure. FIG. 7 illustrates an example of a touch sensor panel formed of nine unit cells (3×3) corresponding to the example unit cell of FIG. 6 (with some modification). It is understood that other touch electrode patterns can be implemented within the scope of this disclosure.

FIG. 6 illustrates an example unit cell corresponding to a touch node according to examples of the disclosure. The unit cell 600 can include a portion of a column touch electrode 602 (corresponding to a "bar") and a portion of a row electrode formed from touch electrode segments 604A-604F (corresponding to "stripes"). A mutual capacitance between the column touch electrode and the row touch electrode can change due to the proximity of an object (e.g., a finger) at a touch node corresponding to the unit cell. The column touch electrode 602 can correspond to a contiguous, electrically connected region, including regions around the touch electrode segments 604A-604F. The touch electrode segments 604A-604F of the row electrode can be electrically connected using one or more bridges 606A-606H that bridge across the neck regions 608A-608D of the column touch electrode 602 between the touch electrode segments 604A-604F. In some examples, one bridge can be used to interconnect two touch electrode segments (e.g., bridges 606A-606D). In some examples, more than one bridge can be used to interconnect two touch electrode segments (e.g., bridges 606A and 606E, bridges 606B and 606F, etc.). Bridge-connected touch electrodes segments 604A-604C (e.g., corresponding to a first "stripe" in the bar-and-stripe pattern) and bridge-connected touch electrode segments 604D-604F (e.g., corresponding to a second "stripe" in the bar-and-stripe pattern) can be electrically connected outside of the unit cell area (e.g., as illustrated in FIG. 7). In some examples, the first and second stripes can be electrically connected to one another within the unit cell area (e.g., with bridges). In some examples, bridges 606A-606H may be achieved using wire bonds or other conductors formed without using a metal mesh layer (e.g., ITO, etc.). In some examples, bridges 606A-606H may be formed using a metal mesh layer (e.g., metal mesh layer 516) different than the metal mesh layer used to form column touch electrode 602 and touch electrode segments 604A-604F (e.g., metal mesh layer 506). The connection between the metal mesh layers can also include a via (or other interconnection), in some examples, to make connections between the first metal mesh layer and the second metal mesh layer. It is understood that that bridges 606A-606H may include multiple metal mesh wires (e.g., increasing the width of the bridge) to meet the resistance requirements for the row touch electrodes.

The distribution of the touch electrode segments within the unit cell can improve the touch signal levels (and therefore the signal-to-noise ratio (SNR) for touch sensing) because mutual capacitance in a single-layer touch sensor panel can be a function of the distance between the touch electrodes that are driven and sensed. For example, the mutual capacitances can be greater along the boundaries between a touch electrode that is driven and a touch electrode that is sensed as compared with the center of the two touch electrodes. Thus, by dividing the row electrode into multiple stripes (thereby reducing the maximum spacing between a region of the drive electrode and a region of a sense electrode in the unit cell), the signal measured at the unit cell can be increased relative to other touch electrode patterns (e.g., a diamond touch electrode pattern, etc.). The impact of the distributed bar-and-stripe pattern on the mutual capacitance can provide increased modulation between finger and the sensor. Additionally, the distribution of the touch electrode segments can provide improved linearity of the touch signal detected as an object moves across the touch sensor panel (e.g., more uniform signal measured by an object, independent on the location of the object on the touch sensor panel). Improved linearity can provide various benefits of improved touch performance that include more precise and accurate touch location detection, reduced wobble, etc.

Although not shown in FIG. 6, in some examples, the unit cell can include buffering regions between portions of column touch electrode 602 and touch electrode segments of rows. The buffer regions can be conductive material that is floating (or grounded or driven with a potential, in some examples). The buffer region can reduce the baseline mutual capacitance of the touch node by increasing the distance between the drive and sense regions. For example, referring to unit cell 712 in FIG. 7, touch electrode segments forming rows in FIG. 6 can be separated on a first boundary with column touch electrode 702C by buffer region 722A and can be separated on a second boundary with column electrode 702C by buffer region 722B. As illustrated in FIG. 7, similar buffer regions can be included between the column touch electrode and the touch electrode segments forming rows across the touch sensor panel. Although FIG. 7 illustrates buffer regions on two sides of each of the touch electrode segments, it is understood that in some examples, the buffering can be on fewer sides (one or no sides) or more sides (three or four sides) of the touch electrode segments. Increasing the separation (e.g., surface area and/or width) can further reduce the baseline capacitance, whereas decreasing the separation can increase the baseline capacitance. In some examples, as illustrated in FIG. 7, the neck region can be free of buffer regions to reduce the impedance of the column touch electrode. Additionally, although buffer regions are shown as continuous along a respective boundary of a touch electrode segment, it is understood that the buffer region can be discontinuous so as to be present in one or more segments along a portion of the boundary. Additionally, although similar buffer regions are shown on all touch electrode segments in unit cell 712, it is understood that different touch electrode segments in a unit cell can have different numbers of buffer regions or buffer regions with different properties (dimensions, distributions, etc.).

Referring back to FIG. 6, it is understood that a unit cell can include fewer touch electrode segments and/or fewer interconnections between touch electrode segments. For example, four touch electrode segments can be connected using two interconnections, rather than connecting the six touch electrode segments of FIG. 6 with the four interconnections of FIG. 6. Reducing the number of interconnections can reduce the baseline mutual capacitance of the touch node because interconnections of bridges 606 can result in increased mutual capacitance due to the proximity between the drive and sense regions at these interconnections. Additionally, reducing the number of interconnections can reduce the resistance of the row touch electrodes. It should be understood that fewer or more interconnections and touch electrode segments can be employed.

It is understood that although FIG. 6 illustrates contiguous columns and segmented rows, in some examples, the column touch electrode can be formed from touch electrode segments that can be interconnected by bridges (e.g., in the neck region), and the row touch electrode can be formed from stripes, each of which can be contiguous (e.g., and may optionally be interconnected in the border area).

It should be understood that although unit cell 600 in FIG. 6 illustrates two stripes in the unit cell (two rows of interconnected touch electrode segments), that the number of stripes can be greater than two (e.g., three, four, etc.) or less than two (e.g., one) in some examples. It should be understood that unit cell 600 is an example unit cell. The number and dimensions of touch electrode segments, the number and dimensions of interconnections between touch electrode segments (and between portions of a column touch electrodes), and the thickness and dimensions of the neck region can be varied according to design considerations, including trading off the impedance of the row and/or column touch electrodes and the baseline capacitance for the unit cell, including an amount of desired touch signal, and including the linearity of the touch signals across the touch sensor panel. Although described separately above, one or more of the above described modifications of the unit cell can be combined in some examples. For example, the multiple bridges of FIG. 6 can be used with the buffer regions of FIG. 7. It should be understood that although column touch electrodes are illustrated as contiguous and row touch electrodes are illustrated as formed of touch electrode segments, in some examples, row touch electrodes can be contiguous and column touch electrodes can be formed of touch electrode segments.

FIG. 7 illustrates an example of a touch sensor panel formed from unit cells according to examples of the disclosure. For example, touch sensor panel 700 can include nine unit cells corresponding to unit cell 712 (3×3 touch nodes), which can be corresponding to the example unit cell of FIG. 6 (e.g., corresponding to unit cell 600, modified to illustrate only a single bridge 706 between touch electrode segments 704 and to include buffer regions, such as buffer regions 722A and 722B). For brevity, the details of the unit cell are not repeated. As illustrated in FIG. 7, touch sensor panel 700 can include three column touch electrodes 702A-702C ("bars") that can be driven during touch sensing operation (e.g., by drive signals provided by routing traces labeled "DRV_N−1", "DRV_N", and "DRV_N+1"). Touch sensor panel 700 can also include three row touch electrodes. Each of the row touch electrodes illustrated in FIG. 7 can include two "stripes" formed of touch electrode segments 704. The touch electrode segments 704 for each "stripe" can be interconnected within the touch sensor panel active area (e.g., in the visible area of the display in a touch screen) by bridges 706 (e.g., metal mesh). Although one bridge 706 between touch electrodes segments is illustrated in FIG. 7, it is understood that additional bridges can be used to improve electrostatic discharge protection, improve mechanical and/or electrical reliability of the connection and/or reduce impedance of the row touch electrode. Additionally, although not shown in FIG. 7, additional bridges can be used to provide the same or similar benefits for column touch electrodes. The two "stripes" of a row electrode can be connected in a border area (e.g., outside of the touch sensor panel active area/outside the visible area of the display) by conductive traces (e.g., metal mesh or otherwise). Each row electrode can be sensed during touch sensing operation (e.g., by sense channels coupled to routing traces labeled "SNS_N−1", "SNS_N", and "SNS_N+1"). The adjacencies of a respective column touch electrode and a respective row touch electrode can form a respective touch node/unit cell of touch sensor panel 700.

Although the example unit cell 712 includes one or more buffer regions, it should be understood that alternative unit cells can be used, such as those described herein. For example, a unit cell may include only one "stripe", or the multiple "stripes" of a unit cell may not be connected in a border area by conductive traces (e.g., one "stripe" per row electrode). Additionally, although a 3×3 grouping of unit cells is illustrated, it is understood that the panel can be of a smaller or larger size (e.g., 2×2, 4×4, 5×5, 10×10, 16×16, etc.) Additionally, although FIG. 7 illustrates column touch electrodes that are driven and rows touch electrodes that are sensed, in some examples, the row touch electrodes can be driven and the column touch electrodes can be sensed.

Figure 8:
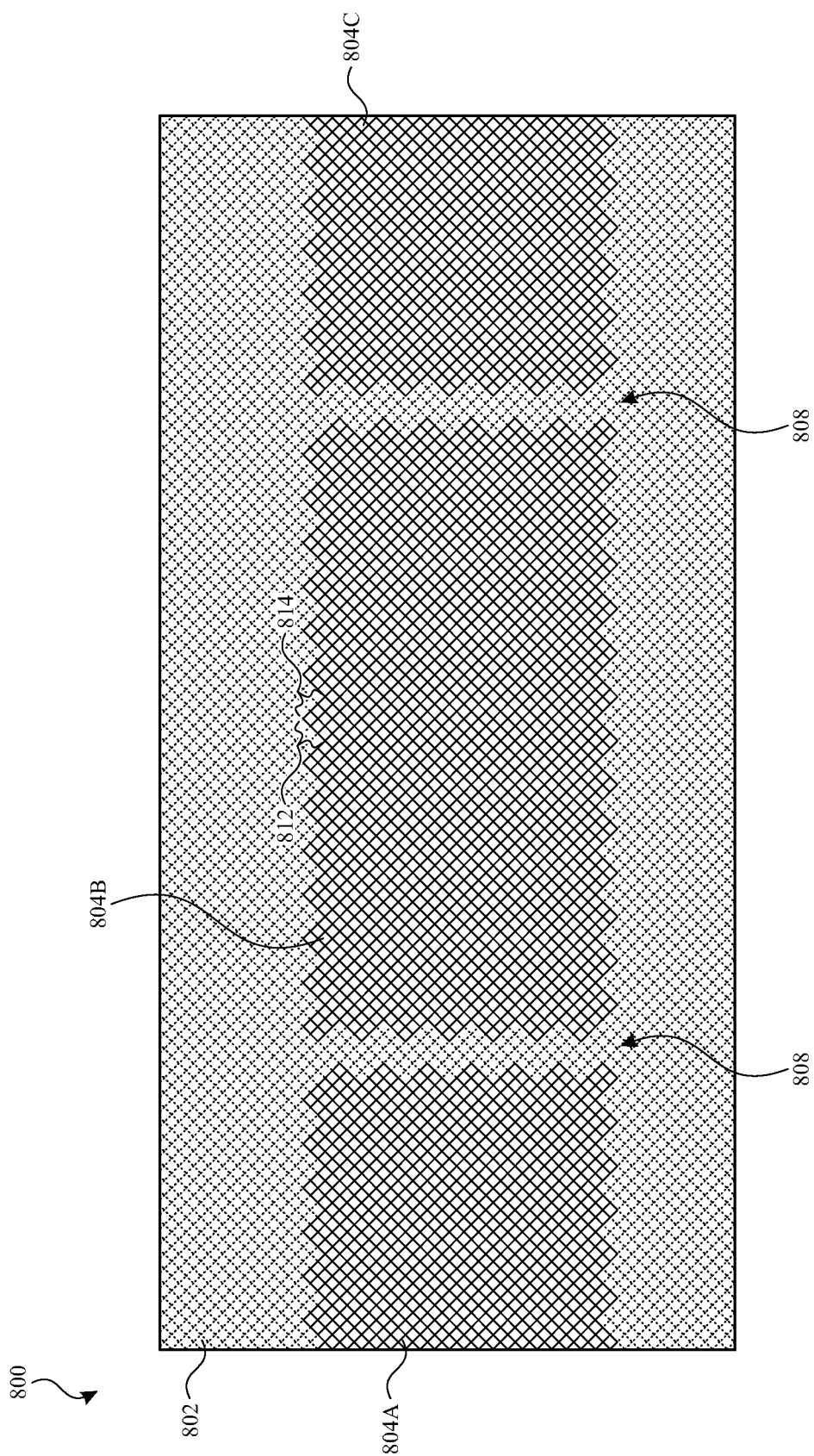
FIG. 8 illustrates a metal mesh corresponding to a portion of unit cell according to examples of the disclosure.

Although FIGS. 6-7 illustrate rectangular electrodes for row and column touch electrodes with linear boundaries, it should be understood that due to the pattern of metal mesh and to reduce the visibility of the metal mesh, the true shape of touch electrodes and their boundaries may not be rectangular. FIG. 8 illustrates a metal mesh corresponding to a portion of unit cell of FIG. 6 according to examples of the disclosure. Metal mesh 800 can correspond, for example, to half of unit cell 600 of FIG. 6. Metal mesh 800 can include a first metal mesh portion 802 corresponding to column touch electrode 602 and second metal mesh portions 804A-804C corresponding to touch electrode segments 604A-604C. Due to the diamond pattern (with 45 degree angles) and to reduce the visibility of the boundaries of the touch electrodes, the first and second metal mesh portions can be non-linear along the boundaries. In some examples, the boundaries between the touch electrodes can be a zig-zag or wave-like pattern. For example, as illustrated in FIG. 8, the boundary between first metal mesh portion 802 and second metal mesh portion 804B can have a zig-zag pattern where the length of segments 812 and 814 can each be a length of three metal mesh wires. A similar pattern can be implemented for the other boundaries illustrated in FIG. 8 (with slight variations at the corners for continuity according to the geometry of the pattern). It should be understood that the length of segments 812 and 814 are exemplary, and other lengths are possible. Additionally, the lengths can be different at different points along a boundary or different between two different boundaries. In some examples, rather than defining the pattern by the lengths of segments such as segments 812 and 814, the zig-zag pattern can be defined by other parameters.

The touch electrodes (and buffer regions) can be formed from metal mesh in the metal mesh layer (e.g., corresponding to metal mesh layer 506) by cuts or electrical discontinuities in the metal mesh wires between the touch electrodes (and/or buffer regions). In some examples, the cuts or electrical discontinuities can be formed at midpoints of metal mesh wires (or otherwise dividing one or more metal mesh wires), rather than having cuts or electrical discontinuities at vertices of two metal mesh wires in the metal mesh pattern.

In some examples, dummy cuts can further reduce visibility of the metal mesh boundary cuts. A dummy cut can interrupt one electrical path between two portions of the metal mesh (on either side of the dummy cut), without electrically isolating the metal mesh due to one or more other electrical paths between two portions of the metal mesh (on either side of the dummy cut). In other words, the portions of the metal mesh can remain at substantially the same electrical potential despite the internal cuts because the portions of the metal mesh are electrically connected. For example, dummy cuts can be made within the first metal mesh portion 802 and/or in the second metal mesh portions 804A-804C that form physical separations in the metal mesh without electrically separating the metal mesh in each respective portion. In some examples, the dummy cuts can form a pattern that can be repeated across each of the touch electrodes. For example, a dummy cut unit (e.g., a pattern of discontinuities) can be defined, and the dummy cut unit can be repeated across the touch screen to form the dummy cuts. In some examples, dummy cuts can also be implemented for buffer regions (e.g., buffer region 722A-722B) between the column touch electrodes and touch electrode segments.

In some examples, dummy cuts in the first metal mesh portion 802 can be restricted to certain regions. For example, dummy cuts may be excluded, or limited, in neck regions 808 of the first metal mesh portion 802. Excluding (or limiting) dummy cuts in the neck regions 808 can be beneficial in some instances to reduce the impedance of the column touch sensor (due to the narrow width of the metal mesh in the neck regions).

Although FIGS. 6-8 illustrate column touch electrodes and row touch electrodes disposed in a first metal mesh layer (e.g., corresponding to metal mesh layer 506) that may include interconnections in a second metal mesh layer (e.g., corresponding to metal mesh layer 516), it should be understood that in some examples, the column touch electrodes can be disposed in one layer and the row touch electrodes can be disposed in another layer (e.g., in a double-sided touch senor configuration as illustrated in FIG. 4A).

As described herein, in some examples, touch electrode architectures can be improved for high-transmittance touch screens or touch screens including high-transmittance regions. For example, one or more optical devices (e.g., optical device(s) 201) can be integrated with touch screen 220 such that light passes through one or more layers of the touch screen. Improved transmittance can improve performance of the optical devices.

Figure 9:
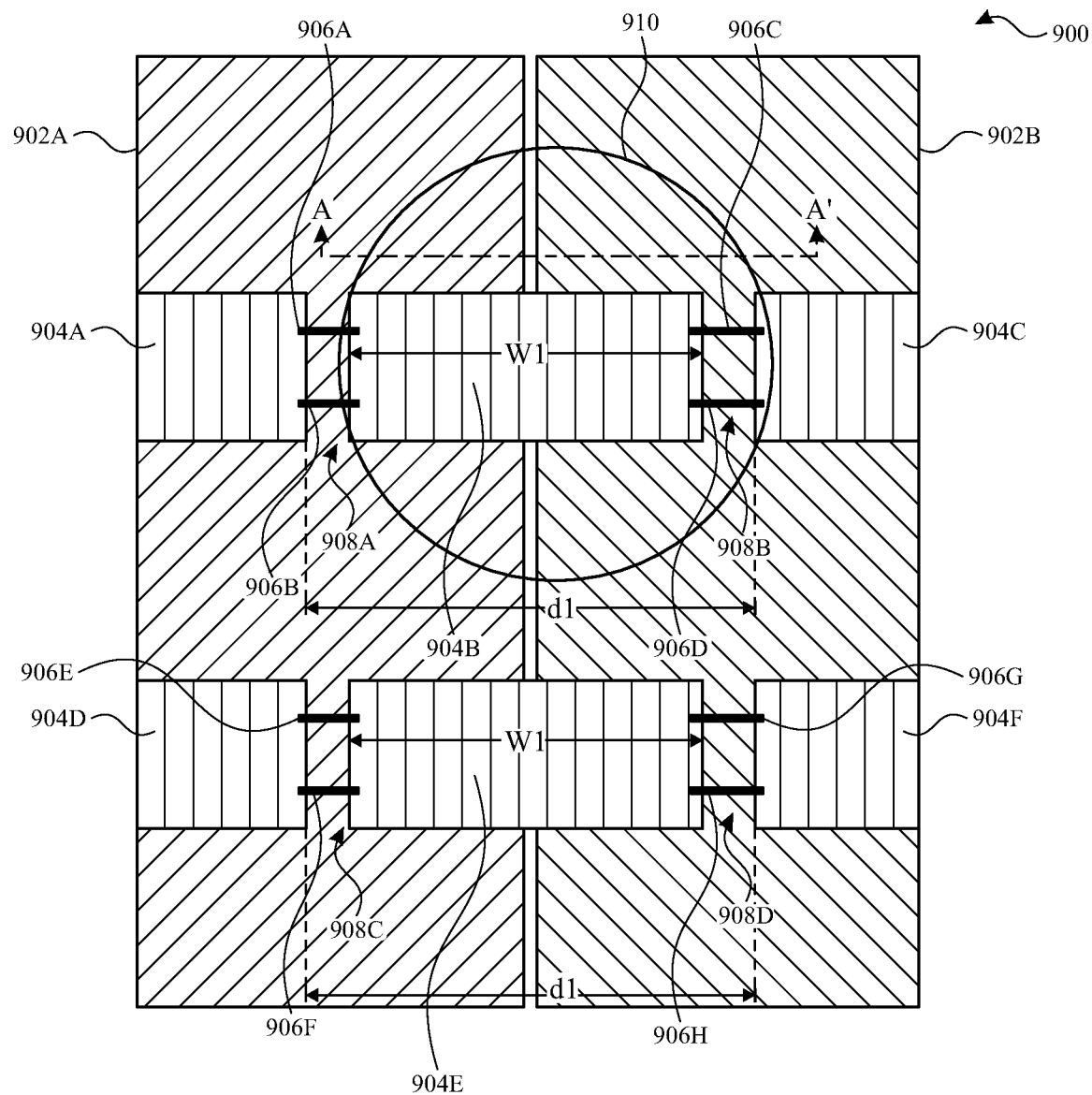
FIGS. 9-12 illustrate portions of example touch screens including a high-transmittance region according to examples of the disclosure.

FIGS. 9-12 illustrates portions of example touch screens including a high-transmittance region according to examples of the disclosure. Although FIGS. 9-12 show a circular high-transmittance region, it is understood that the high-transmittance region may have a different shape (e.g., square, rectangular, a shape corresponding to the geometry of the optical components, a non-regular geometric shape, etc.). For example, region 900 in FIG. 9 can correspond to a view of a region 720 of touch sensor panel 700 shown in FIG. 7 including two column touch electrodes and two row touch electrodes (or two stripes of a single row electrode). Region 900 of a touch sensor panel can include portions of a first column touch electrode 902A including neck regions 908A and 908C and a second column touch electrode 902B including neck regions 908B and 908D (e.g., corresponding to column touch electrodes 602A-602B, 702A-702B, and neck regions 608A-608D), portions of touch electrode segments 904A-904C interconnected using bridges 906A-906D (e.g., corresponding touch electrode segments 604A-604C, 704 interconnected using bridges 606A, 606B, 606E, 606F, 706), and portions of touch electrode segments 904D-904F interconnected using bridges 906E-906H (e.g., corresponding touch electrode segments 604D-604F, 704 interconnected using bridges 606C, 606D, 606G, 606H, 706). As described herein, the touch electrodes and bridges can be formed of metal mesh in one or more metal mesh layer s (e.g., touch electrodes in a first metal mesh layer and bridges in a second metal mesh layer). Region 910 (e.g., corresponding to region 710) indicates a region that requires improved transmittance of the touch electrodes due to one or more optical components. Region 910 can intersect the first row electrode (e.g., corresponding to touch electrode segments 904A-904C) and not intersect the second row electrode (e.g., corresponding to touch electrode segments 904D-904F). As illustrated in FIG. 9, touch electrode segments 904A-904C (also referred to herein as a first touch electrode segment, a second touch electrode segment, and a third touch electrode segment) are aligned on the horizontal axis with touch electrode segments 904D-904F (also referred to herein as a fourth touch electrode segment, a fifth touch electrode segment, and a sixth touch electrode segment). Additionally, as illustrated in FIG. 9, neck regions 908A and 908C of column touch electrode 902A are aligned on the horizontal axis, and neck regions 908B and 908D of column touch electrode 902B are aligned on the horizontal axis.

Figure 10:
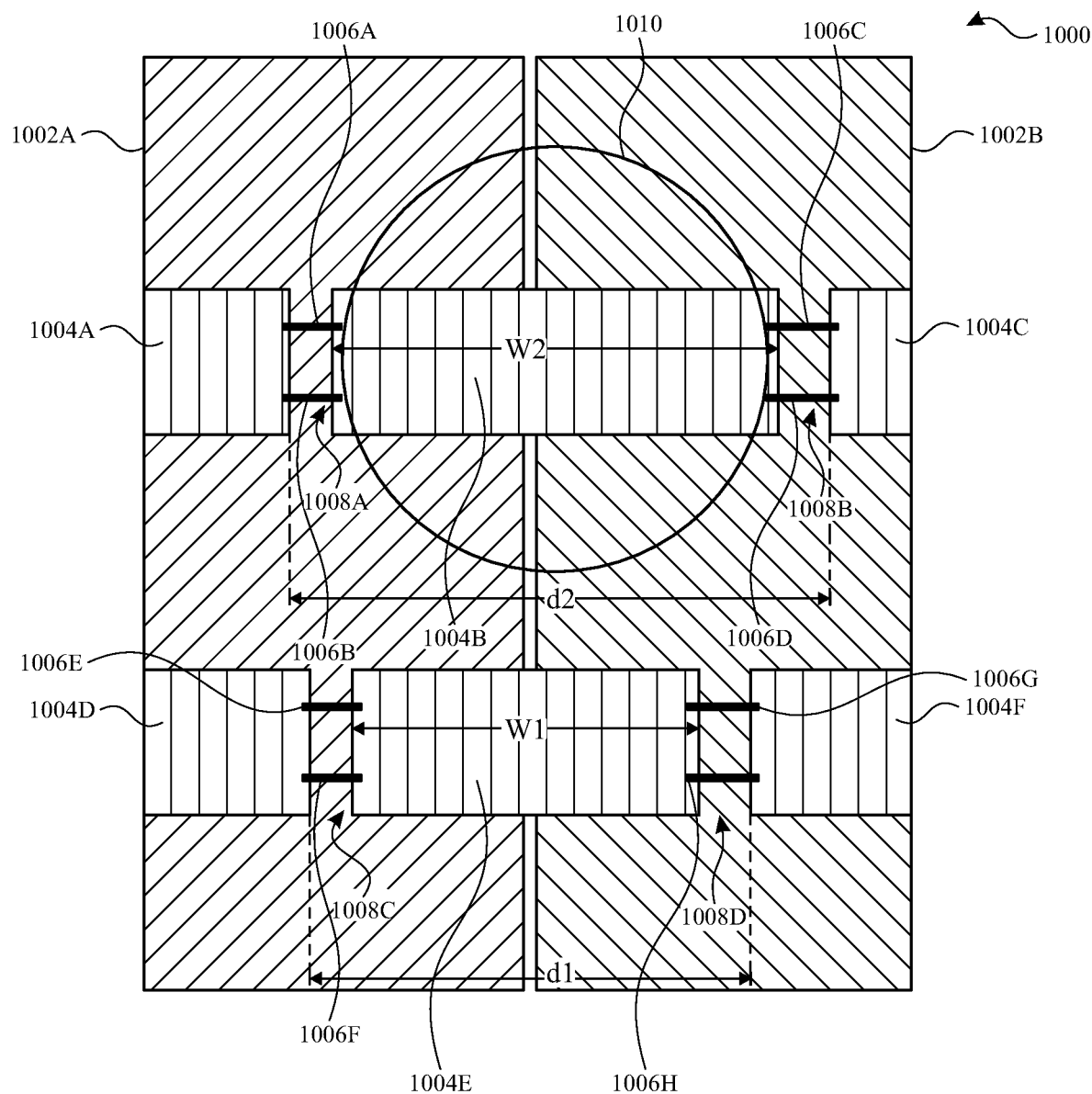

In some examples, to improve transmittance of the touch screen in a region corresponding to optical components (e.g., region 910), bridges can be removed from the region. FIG. 10 illustrates a region 1000 of a touch sensor panel (e.g., corresponding to region 900) that can include portions of a first column touch electrode 1002A including neck regions 1008A and 1008C and a second column touch electrode 1002B including neck regions 1008B and 1008D (e.g., corresponding to column touch electrodes 902A-902B and neck regions 908A-908D), portions of touch electrode segments 1004A-1004C interconnected using bridges 1006A-1006D (e.g., corresponding touch electrode segments 904A-904C interconnected using bridges 906A-906D), and portions of touch electrode segments 1004D-1004F interconnected using bridges 1006E-1006H (e.g., corresponding touch electrode segments 904D-904F interconnected using bridges 906E-906H). Region 1010 (e.g., corresponding to region 910) indicates a region that requires improved transmittance of the touch electrodes due to one or more optical components. Region 1010 can intersect the first row electrode (e.g., corresponding to touch electrode segments 1004A-1004C) and not intersect the second row electrode (e.g., corresponding to touch electrode segments 1004D-1004F).

As shown in FIG. 10, bridges 1006A-1006D are outside region 1010, unlike bridges 906A-906D of FIG. 9, which are partially or fully within region 910. Moving the bridges outside of region 1010 can be achieved by modifying the touch electrode pattern for the area at and around region 1010. Specifically, touch electrode segments 1004A and 1004C (e.g., corresponding to a first row electrode) can have increased separation compared with touch electrode segments 1004D and 1004F (e.g., corresponding to a second row electrode that does not intersect a high-transmittance region) (e.g., d2 of FIG. 10 is greater than d1 of FIG. 9), and touch electrode segment 1004B can have increased width compared with touch electrode segment 904B (e.g., W2 of FIG. 10 is greater than W1 of FIG. 9). Another way of viewing the modification of FIG. 10 is as a shifting of the neck region 1008A and 1008B for the column touch electrodes/bars outside region 1010 compared with the neck regions 908A and 908B shown partially or fully within region 910 in FIG. 9. As a result, the neck regions 1008A and 1008C for column touch electrode 1002A are offset on the horizontal axis, and the neck regions 1008B and 1008D for column touch electrode 1002B are offset on the horizontal axis. As a result of the modification, touch electrode segments 1004A-1004C are only partially aligned with touch electrode segments 1004D-1004F along the horizontal axis.

Shifting the bridges outside of the high-transmittance region can allow for the remaining metal mesh of the touch electrodes in region 1010 to have uniformity within the region for improved optical performance (whereas the bridges create some non-uniformities in a different metal mesh layer). Additionally, shifting the bridges out of the high-transmittance region can allow for maintaining the resistance of the column touch electrode (e.g., there is no change in the dimensions of the neck regions 1008A-1008D for the column touch electrodes compared with the dimensions of the neck regions 908A-908D).

It is understood that in some examples, the bridges may be only partially moved out of region 1010, and that partial movement of the bridges can also provide partial improvement in the transmittance. It is also understood that, in some examples, the changes to touch electrode segments 1004A-1004C in FIG. 10 can be applied to other regions of the touch sensor panel (e.g., to touch electrode segments 1004D-1004F) for pattern uniformity.

Figure 11:
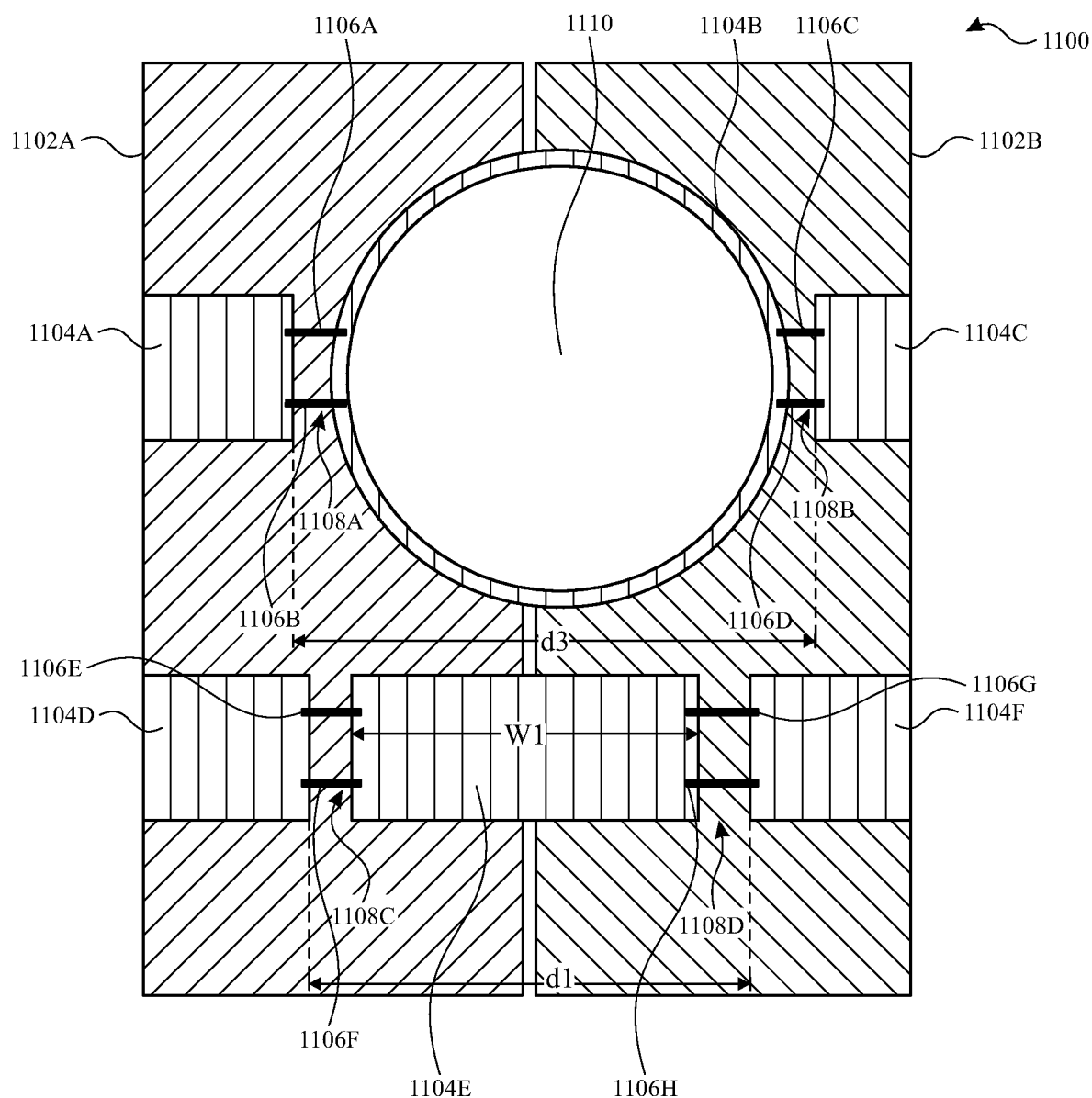

In some examples, in addition to removing the bridges from a region of the panel corresponding to an optical component, metal mesh of the touch electrodes can be removed from the region. FIG. 11 illustrates region 1100 of a touch sensor panel (e.g., corresponding to regions 900, 1000) that includes portions of a first column touch electrode 1102A and a second column touch electrode 1102B (e.g., corresponding to column touch electrodes 902A-902B, 1002A-1002B). FIG. 11 also illustrates portions of touch electrode segments 1104A-1104C interconnected using bridges 1106A-1106D (e.g., corresponding touch electrode segments 904A-904C, 1004A-1004C interconnected using bridges 906A-906D, 1006A-1006D), and portions of touch electrode segments 1104D-1104F interconnected using bridges 1106E-1106H (e.g., corresponding touch electrode segments 904D-904F, 1004A-1004F interconnected using bridges 906E-906H, 1006E-1006H). Region 1110 (e.g., corresponding to region 910, 1010) indicates a region that requires improved transmittance of the touch electrodes due to one or more optical components, which can intersect the first row electrode (e.g., corresponding to touch electrode segments 1104A-1104C) and not intersect the second row electrode (e.g., corresponding to touch electrode segments 1104D-1104F).

As shown in FIG. 11, bridges 1106A-1106D are outside region 1110, unlike bridges 906A-906D of FIG. 9, which are partially or fully within region 910. Additionally, touch electrode segment 1104B (e.g., on the perimeter of region 1110) and column touch electrodes 1102A-1102B can be disposed outside of region 1110 (e.g., on the perimeter of touch electrode segment 1104B). Moving the bridges and touch electrodes outside of region 1110 can be achieved by modifying the touch electrode pattern for the area at and around region 1110. Specifically, touch electrode segments 1104A and 1104C (e.g., corresponding to a first row electrode) can have increased separation compared with touch electrode segments 1104D and 1104F (e.g., corresponding to a second row electrode that does not intersect a high-transmittance region), and in some examples, compared with touch electrode segments 1004A and 1004C (e.g., d3 of FIG. 11 is greater than d1 of FIG. 9, and possibly d3 of FIG. 11 is greater than d2 of FIG. 10). The pattern of column touch electrodes 1102A-1102B and touch electrode segment 1104B can be modified to remove any patterning from region 1110. For example, as shown in FIG. 11, touch electrode segment 1104B optionally circumscribes region 1110 and column touch electrodes 1102A-1102B optionally together circumscribe touch electrode segment 1104B. In some examples, touch electrode segments 1104B can be designed to have dimensions that allow for the first row electrode including touch electrode segments 1104B to have the same resistance as (or within a threshold of, such as 1%, 5%, 10%, etc.) the second row electrode including touch electrode segment 1104E. In some examples, touch electrode segments 1104B can have an area that is the same as (or within a threshold of, such as 1%, 5%, 10%, etc.) the area of touch electrode segment 1104E, such that the capacitive coupling for the touch electrode segments 1104B and 1104E can be the same (or within a threshold). In some examples, touch electrode segments 1104B can be disc-shaped, where an inner diameter of the disc matches the border of region 1110. It is understood that the shape of touch electrode segment 1104B (e.g., the inner dimensions) may be different when region 1110 has a different shape than shown. Additionally, it is understood that the inner dimensions and outer dimensions of touch electrode segment can be different (e.g., circular inner dimensions, polygonal outer dimensions, etc.) Additionally, it is understood that touch electrode segment 1104B may not fully circumscribe region 1110. For example, an arc or half-circle can be used to implement touch electrode segment 1104B to create a path between touch electrode segment 1104A and 1104B (using two or more of bridges 1106A-1106D).

Shifting the bridges and touch electrodes outside of the high-transmittance region can allow for improved optical performance by removing the non-transparent or opaque metal mesh. Additionally, the touch electrode architecture allows for maintaining connections to form the column touch electrodes (e.g., using the neck regions) and row touch electrodes (e.g., using bridges) outside region 1110. As shown in FIG. 11, the connections to form the row electrode can be achieved by routing the touch electrode segment 1104B around region 1110 in one metal mesh layer (e.g., metal mesh layer 506) along with the other touch electrodes, and using bridges in another metal mesh layer (e.g., metal mesh layer 516) to bridge the neck region of the column touch electrodes.

It is understood that, in some examples, the bridges and/or touch electrodes may be only partially moved out of region 1110, and that partial movement of the bridges and/or touch electrodes can also provide partial improvement in the transmittance. It is also understood that, in some examples, the changes to touch electrode segments 1104A-1104C in FIG. 11 can be applied to other regions of the touch sensor panel (e.g., for pattern uniformity).

Figure 12:
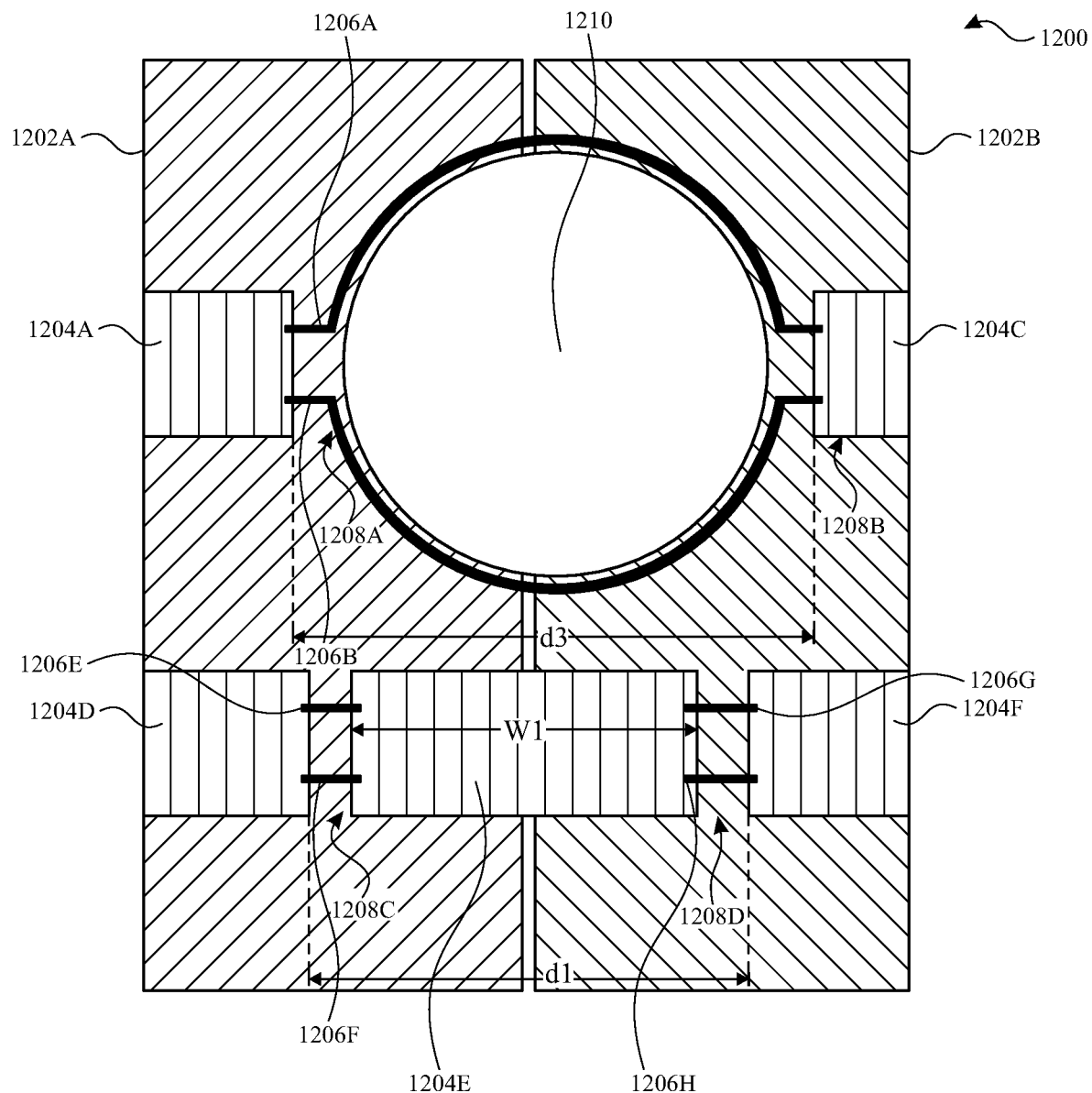

FIG. 12 illustrates region 1200 of a touch sensor panel (e.g., corresponding to regions 900, 1000, 1100) that includes portions of a first column touch electrode 1202A and a second column touch electrode 1202B (e.g., corresponding to column touch electrodes 902A-902B, 1002A-1002B, 1102A-1102B). FIG. 12 also illustrates portions of touch electrode segments 1204A and 1204C interconnected using bridges 1206A-1206B, and portions of touch electrode segments 1204D-1204F interconnected using bridges 1206E-1206H (e.g., corresponding touch electrode segments 904D-904F, 1004D-1004F, 1104D-1104F interconnected using bridges 906E-906H, 1006E-1006H, 1106E-1106H). Region 1210 (e.g., corresponding to region 910, 1010, 1110) indicates a region that requires improved transmittance of the touch electrodes due to one or more optical components, which can intersect the first row electrode (e.g., corresponding to touch electrode segments 1204A and 1204C) and not intersect the second row electrode (e.g., corresponding to touch electrode segments 1204D-1204F).

As shown in FIG. 12, bridges 1206A-1206B are outside region 1210, unlike bridges 906A-906D of FIG. 9, which are partially or fully within region 910. Additionally, column touch electrodes 1202A-1202B can be disposed outside of region 1210 (e.g., on the perimeter of region 1210). A touch electrode segment that would otherwise have been located between touch electrode segments 1204A and 1204C (e.g., like touch electrode segments 904B, 1004B, 1104B) is removed entirely from region 1200. Instead, bridges 1206A and 1206B are implemented as longer bridges compared with bridges 906A-906D, 1006A-1006D, 1106A-1106D. Bridges can be routed around the outside of region 1210 in a different layer than the touch electrodes. In some examples, region 1200 can represent an appearance of a portion of a touch sensor panel corresponding to a first row electrode and region 900 can represent an appearance of a different portion of the touch sensor panel corresponding to a second row electrode, but without including high-transmittance region 910 (e.g., with regions 900 and 1200 being horizontally aligned in the touch sensor panel). Like the touch electrode architecture of FIG. 11, the touch electrode architecture of FIG. 12 can also have increased separation between touch electrode segments 1204A and 1204C (e.g., corresponding to a first row electrode) compared with touch electrode segments 1204D and 1204F (e.g., corresponding to a second row electrode that does not intersect a high-transmittance region), and, in some examples, compared with touch electrode segments 1004A and 1004C (e.g., d3 of FIG. 12 is greater than d1 of FIG. 9, and possibly d3 of FIG. 12 is greater than d2 of FIG. 10). It is understood that the shape of bridges 1206A-1206B may be different when region 1210 has a different shape than shown. Additionally, it is understood that more and/or thicker bridges can be used in the touch electrode architecture of FIG. 12 compared with the bridges of the touch electrode architectures of FIGS. 9-11 to compensate for to the length of bridges 1206A-1206B compared with the bridges of FIGS. 9-11. It is also understood that bridges may be implemented in a manner in which the bridges do not fully circumscribe region 1210. For example, a half-circle can be used to implement bridge 1206A to create a path between touch electrode segment 1204A and 1204C along half the circumference of region 1210 without using a bridge along the second half of the circumference of region 1210.

Shifting the bridges and touch electrodes outside of the high-transmittance region can allow for improved optical performance by removing the non-transparent or opaque metal mesh. Additionally, the touch electrode architecture allows for maintaining connections to form the column touch electrodes (e.g., using the neck regions) and row touch electrodes (e.g., using bridges) outside region 1210. As shown in FIG. 12, the connections to form the row electrode can be achieved by routing the bridges 1206A-1206B around region 1210 in one metal mesh layer (e.g., metal mesh layer 516) different than another metal mesh layer (e.g., metal mesh layer 506) in which the other touch electrodes are implemented.

It is understood that in some examples, the bridges may be only partially moved out of region 1210, and that partial movement of the bridges can also provide partial improvement in the transmittance. It is also understood that, in some examples, the changes to touch electrode segments 1204A and 1204C and bridges 1206A-1206B in FIG. 12 can be applied to other regions of the touch sensor panel (e.g., for pattern uniformity). In some examples, bridges 1206A and 1206B can be used in touch electrode architecture of FIG. 11 in place of bridges 1106A-1106D (e.g., to reduce the line resistance of the row electrode).

In some examples, transmittance can be improved by using transparent or partially transparent material(s) in place of opaque materials to form touch electrodes and/or bridges in a region that requires high-transmittance. Using a transparent or partially transparent material(s) in place of opaque materials can allow for touch electrode uniformity across the touch sensor panel for improved touch performance (e.g., better uniformity of touch signal across the panel) as well as improving the transmittance required for the region due to optical components. Referring back to FIG. 9 (or similarly FIG. 10), some or all of the portions of the first column touch electrode 902A, the second column touch electrode 902B, the touch electrode segments 904B-904C, and/or bridges 906A-906D that overlap with region 910 can be implemented using transparent or semi-transparent materials, whereas outside of regions 910 (and outside multiple similar regions when multiple high-transmittance regions are implemented) the touch electrodes and/or bridges can be implemented with opaque materials (e.g., metal mesh). In some examples, the portions of the touch electrodes (e.g., first column touch electrode 902A, second column touch electrode 902B, touch electrode segments 904B-904C) can be implemented using transparent or semi-transparent materials, whereas bridges 906A-906D can be implemented using opaque materials (e.g., optionally by shifting bridges outside of high-transmittance region as in the architecture of FIG. 10).

In some examples, the transparent or semi-transparent material can include Indium Tin Oxide (ITO). In some examples, the transparent or semi-transparent material can include conductive polymers, graphene, nanowires (e.g., silver nanowires), or nanotubes (e.g., carbon nanotubes). In some examples, the transparent or semi-transparent material(s) used to implement the portions of the touch electrodes can be implemented in the same layer in the stack-up as opaque metal mesh. For example, metal mesh layer 506 in the stack of touch screen 500 can represent a layer in which opaque metal mesh and a transparent or semi-transparent material can be disposed, with the transparent or semi-transparent material(s) disposed in the high-transmittance region(s) and with the opaque metal mesh be disposed outside the high-transmittance region(s). In some examples, within the high-transmittance region(s) the transparent or semi-transparent material(s) can be patterned in a similar manner (e.g., mesh) as the opaque metal mesh material forming touch electrodes outside of the high-transmittance region(s). In some examples, within the high-transmittance region(s) the transparent or semi-transparent material(s) can be patterned in a different manner as the opaque metal mesh material forming touch electrodes outside of the high-transmittance region(s). In some examples, within the high-transmittance region(s) the transparent or semi-transparent material(s) can be solid (e.g., not a mesh pattern), unlike the mesh pattern of touch electrodes outside of the high-transmittance region(s).

Figure 13:
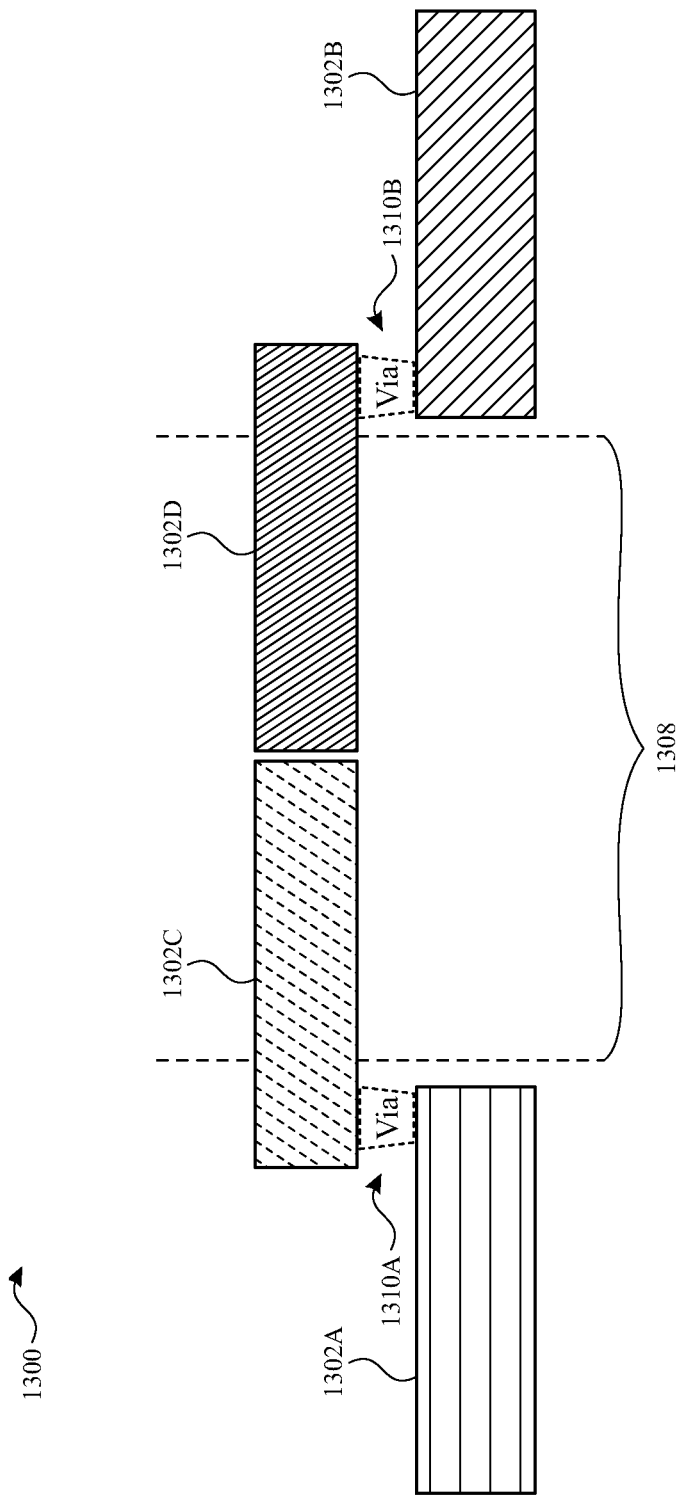
FIG. 13 illustrates a cross-sectional view of a portion of an example touch screen including a high-transmittance region according to examples of the disclosure.

In some examples, the transparent or semi-transparent material(s) forming touch electrodes and/or bridges can be formed in a different layer than the touch electrodes formed from opaque metal mesh (e.g., a layer above or below metal mesh layer 506). FIG. 13 illustrates a cross-sectional view of a portion of an example touch screen including a high-transmittance region according to examples of the disclosure. The cross-sectional view 1300 of FIG. 13 is along the line AA' shown in FIG. 9 through region 910. FIG. 13 illustrates portions of column electrodes 1302A and 1302B in a first layer outside of high-transmittance region 1308 (e.g., corresponding to portions of column electrodes 902A-902B and region 910 in FIG. 9). FIG. 13 also illustrates portions of column touch electrodes 1302C and 1302D in a different region within high-transmittance region 1308 (e.g., corresponding to other portions of column electrodes 902A-902B). In some examples, portions of column touch electrodes 1302C and 1302D partially extend outside of high-transmittance region 1308 to enable coupling between the portions of column electrodes in the two layers outside of region 1308. For example, as shown in FIG. 13, a via 1310A (or multiple vias) can connect touch electrode 1302A and 1302C outside region 1308, and a via 1310B (or multiple vias) can connect touch electrode 1302B and 1302D outside region 1308. In some examples, connections between the touch electrodes in the two layers can be achieved using via-like connections within region 1308 (e.g., near the perimeter of region 1308). In some examples, vias 1310A-1310B can be omitted so that touch electrodes 1302C and 1302D electrically float. In such examples, touch electrodes 1302A and 1302C can be coupled capacitively and touch electrodes 1302B and 1302D can be coupled capacitively for use in touch sensing.

Although primarily described in the context of high-transmittance region(s), it is understood that transparent material may be used for touch electrodes across the touch sensor panel (e.g., both within and outside high-transmittance regions corresponding to optical components).

It is understood that although the touch electrode architectures of FIGS. 9-13 are described separately, that features can be combined in some examples. For example, the use of transparent material in the high-transmittance region(s) can be applied to the touch electrode architecture of FIG. 9 or 10. Additionally or alternatively, the routing of the touch electrode architecture of FIG. 12 can be used in combination with the touch electrode architecture (including touch electrode segment 1104B) of FIG. 11. It is understood that although the touch electrode architectures of FIGS. 9-13 use the bar-and-stripe design of unit cells 600 or 712, that other patterning can be used, and that the boundaries of the touch electrodes and/or routing may not be rectangular (e.g., as described with reference to FIG. 8). It is also understood that although FIGS. 9-13 show the high-transmittance region overlapping two columns and one row, that the high transmittance region can overlap fewer or more columns and/or more rows.

Therefore, according to the above, some examples of the disclosure are directed to a touch screen. The touch screen can comprise: a display having an active area; an optical device in the active area at a position corresponding to a first region; and a plurality of touch electrodes formed of metal mesh disposed in a first metal mesh layer disposed over the active area of the display. The plurality of touch electrodes can include: a plurality of contiguous column touch electrodes including a first column touch electrode and a second column touch electrode; and a plurality of row touch electrodes including a first row touch electrode and a second row touch electrode. The first row touch electrode can be formed from a first plurality of touch electrode segments interconnected by a first plurality of bridges formed at least partially in a second metal mesh layer different from the first metal mesh layer. The second row touch electrode can be formed from a second plurality of touch electrode segments interconnected by a second plurality of bridges formed at least partially in the second metal mesh layer. The first plurality of touch electrode segments includes a first touch electrode segment and a second touch electrode segment. The first region is between the first touch electrode segment and the second touch electrode segment. The second plurality of touch electrode segments includes a fourth touch electrode segment, a fifth touch electrode segment, and a sixth touch electrode segment. The fourth touch electrode segment, the fifth touch electrode segment, and the sixth touch electrode segment can be consecutive within the second row touch electrode. A distance between the first touch electrode segment and the second touch electrode segment can be greater than a distance between the fourth touch electrode segment and the sixth touch electrode segment.

Additionally or alternatively to one or more of the examples disclosed above, in some examples, the first plurality of touch electrode segments can include a third touch electrode segment that is outside the first region. Additionally or alternatively to one or more of the examples disclosed above, in some examples, the third touch electrode segment can correspond to the first column touch electrode and the second column touch electrode. Additionally or alternatively to one or more of the examples disclosed above, in some examples, the first plurality of bridges can include a first bridge between the first touch electrode segment and the third touch electrode segment and a second bridge between the second touch electrode segment and the third touch electrode segment. The first bridge and the second bridge can be outside the first region. Additionally or alternatively to one or more of the examples disclosed above, in some examples, the first bridge and the second bridge together circumscribe the first region. Additionally or alternatively to one or more of the examples disclosed above, in some examples, the third touch electrode segment circumscribes the first region.

Additionally or alternatively to one or more of the examples disclosed above, in some examples, the first plurality of bridges can include a first bridge between the first touch electrode segment and the second touch electrode segment and a second bridge between the first touch electrode segment and the second touch electrode segment. The first bridge and the second bridge can be outside the first region. Additionally or alternatively to one or more of the examples disclosed above, in some examples, the first bridge and the second bridge together circumscribe the first region.

Additionally or alternatively to one or more of the examples disclosed above, in some examples, a first neck region of the first column touch electrode corresponding to the first row touch electrode is offset on a horizontal axis from a second neck region of the first column touch electrode corresponding to the second row touch electrode.

Some examples of the disclosure are directed to a touch-sensitive device. The touch-sensitive device can comprise: an energy storage device; communication circuitry; a touch controller; and a touch screen. The touch screen can comprise: a display having an active area; an optical device in the active area at a position corresponding to a first region; and a plurality of touch electrodes formed of metal mesh disposed in a first metal mesh layer disposed over the active area of the display. The plurality of touch electrodes can include: a plurality of contiguous column touch electrodes including a first column touch electrode and a second column touch electrode; and a plurality of row touch electrodes including a first row touch electrode and a second row touch electrode. The first row touch electrode can be formed from a first plurality of touch electrode segments interconnected by a first plurality of bridges formed at least partially in a second metal mesh layer different from the first metal mesh layer. The second row touch electrode can be formed from a second plurality of touch electrode segments interconnected by a second plurality of bridges formed at least partially in the second metal mesh layer. The first plurality of touch electrode segments includes a first touch electrode segment and a second touch electrode segment. The first region is between the first touch electrode segment and the second touch electrode segment. The second plurality of touch electrode segments includes a fourth touch electrode segment, a fifth touch electrode segment, and a sixth touch electrode segment. The fourth touch electrode segment, the fifth touch electrode segment, and the sixth touch electrode segment can be consecutive within the second row touch electrode. A distance between the first touch electrode segment and the second touch electrode segment can be greater than a distance between the fourth touch electrode segment and the sixth touch electrode segment.

Some examples of the disclosure are directed to a touch screen. The touch screen can comprise a display having an active area; an optical device in the active area at a position corresponding to a first region; and a plurality of touch electrodes disposed in a first layer disposed over the active area of the display. The plurality of touch electrodes can include: a plurality of column touch electrodes including a first column touch electrode and a second column touch electrode, the first column touch electrode and the second column touch electrode formed at least partially of metal mesh; and a plurality of row touch electrodes formed at least partially of metal mesh. A first row touch electrode of the plurality of row touch electrodes can be formed from a plurality of touch electrode segments interconnected by a first plurality of bridges formed at least partially in a second layer different from the first layer. A first portion of the first column touch electrode, a first portion of the second column touch electrode, or a first portion of the at least one of the plurality of touch electrode segments within the first region can be formed from a transparent material. Additionally or alternatively to one or more of the examples disclosed above, in some examples, the first portion of the first column touch electrode, the first portion of the second column touch electrode, or the first portion of the at least one of the plurality of touch electrode segments within the first region that is formed from the transparent material can be patterned with a first pattern. Additionally or alternatively to one or more of the examples disclosed above, in some examples, a second portion of the first column touch electrode, a second portion of the second column touch electrode, or a second portion of the at least one of the plurality of touch electrode segments outside the first region can be formed from the metal mesh patterned with the first pattern. Additionally or alternatively to one or more of the examples disclosed above, in some examples, the first portion of the first column touch electrode, the first portion of the second column touch electrode, or the first portion of the at least one of the plurality of touch electrode segments within the first region that is formed from the transparent material can be solid. Additionally or alternatively to one or more of the examples disclosed above, in some examples, the first portion of the first column touch electrode, the first portion of the second column touch electrode, or the first portion of the at least one of the plurality of touch electrode segments within the first region can be disposed in the second layer or a third layer different from the first layer and the second layer. Additionally or alternatively to one or more of the examples disclosed above, in some examples, the first portion of the first column touch electrode disposed in the second layer or the third layer can be coupled to a second portion of the first column touch electrode outside the first region using a first via, the first portion of the second column touch electrode disposed in the second layer or the third layer can be coupled to a second portion of the second column touch electrode outside the first region using a second via, or the first portion of the at least one of the plurality of touch electrode segments disposed in the second layer or the third layer can be coupled to a second portion of the at least one of the plurality of touch electrode segments outside the first region using a third via. Additionally or alternatively to one or more of the examples disclosed above, in some examples, the first portion of the first column touch electrode disposed in the second layer or the third layer can be capacitively coupled to a second portion of the first column touch electrode outside the first region, the first portion of the second column touch electrode disposed in the second layer or the third layer can be capacitively coupled to a second portion of the second column touch electrode outside the first region, or the first portion of the at least one of the plurality of touch electrode segments disposed in the second layer or the third layer can be capacitively coupled to a second portion of the at least one of the plurality of touch electrode segments outside the first region.

Some examples of the disclosure are directed to a touch-sensitive device. The touch-sensitive device can comprise: an energy storage device; communication circuitry; a touch controller; and a touch screen. The touch screen can comprise a display having an active area; an optical device in the active area at a position corresponding to a first region; and a plurality of touch electrodes disposed in a first layer disposed over the active area of the display. The plurality of touch electrodes can include: a plurality of column touch electrodes including a first column touch electrode and a second column touch electrode, the first column touch electrode and the second column touch electrode formed at least partially of metal mesh; and a plurality of row touch electrodes formed at least partially of metal mesh. A first row touch electrode of the plurality of row touch electrodes can be formed from a plurality of touch electrode segments interconnected by a first plurality of bridges formed at least partially in a second layer different from the first layer. A first portion of the first column touch electrode, a first portion of the second column touch electrode, or a first portion of the at least one of the plurality of touch electrode segments within the first region can be formed from a transparent material.

Although examples of this disclosure have been fully described with reference to the accompanying drawings, it is to be noted that various changes and modifications will become apparent to those skilled in the art. Such changes and modifications are to be understood as being included within the scope of examples of this disclosure as defined by the appended claims.

The invention claimed is:

1. A touch screen comprising:
   a display having an active area, the display including a plurality of light emitters configurable to display one or more images;
   an optical device, different from the plurality of light emitters, in the active area at a position corresponding to a first region; and
   a plurality of touch electrodes disposed in a first layer disposed over the active area of the display, wherein the plurality of touch electrodes includes:
      a plurality of column touch electrodes including a first column touch electrode and a second column touch electrode, wherein the first column touch electrode and the second column touch electrode is formed at least partially of metal mesh; and
      a plurality of row touch electrodes formed at least partially of metal mesh, wherein a first row touch electrode of the plurality of row touch electrodes is formed from a plurality of touch electrode segments interconnected by a first plurality of bridges formed at least partially in a second layer different from the first layer;
   wherein a distance between two segments of the plurality of touch electrode segments is greater than a distance between two non-consecutive segments of a second plurality of touch electrode segments of a second row touch electrode of the plurality of row touch electrodes, wherein the two segments of the plurality of touch electrode segments are separated by one or fewer intervening segments.

2. The touch screen of claim 1, wherein a first portion of the first column touch electrode, a first portion of the second column touch electrode, or a first portion of the at least one of the plurality of touch electrode segments within the first region is formed from a transparent material and is patterned with a first pattern.

3. The touch screen of claim 2, wherein a second portion of the first column touch electrode, a second portion of the second column touch electrode, or a second portion of the at least one of the plurality of touch electrode segments outside the first region is formed from the metal mesh patterned with the first pattern.

4. The touch screen of claim 1, wherein a first portion of the first column touch electrode, a first portion of the second column touch electrode, or a first portion of the at least one of the plurality of touch electrode segments within the first region is formed from a transparent material and is solid.

5. The touch screen of claim 1, wherein a first portion of the first column touch electrode, a first portion of the second column touch electrode, or a first portion of the at least one of the plurality of touch electrode segments within the first region is disposed in the second layer or a third layer different from the first layer and the second layer.

6. The touch screen of claim 5, wherein the first portion of the first column touch electrode disposed in the second layer or the third layer is coupled to a second portion of the first column touch electrode outside the first region using a first via, the first portion of the second column touch electrode disposed in the second layer or the third layer is coupled to a second portion of the second column touch electrode outside the first region using a second via, or the first portion of the at least one of the plurality of touch electrode segments disposed in the second layer or the third layer is coupled to a second portion of the at least one of the plurality of touch electrode segments outside the first region using a third via.

7. The touch screen of claim 5, wherein the first portion of the first column touch electrode disposed in the second layer or the third layer is capacitively coupled to a second portion of the first column touch electrode outside the first region, the first portion of the second column touch electrode disposed in the second layer or the third layer is capacitively coupled to a second portion of the second column touch electrode outside the first region, or the first portion of the at least one of the plurality of touch electrode segments disposed in the second layer or the third layer is capacitively coupled to a second portion of the at least one of the plurality of touch electrode segments outside the first region.

8. A touch screen comprising:
   a display having an active area, the display including a plurality of light emitters configurable to display one or more images;
   an optical device, different from the plurality of light emitters, in the active area at a position corresponding to a first region; and
   a plurality of touch electrodes disposed in a first layer disposed over the active area of the display, wherein the plurality of touch electrodes includes:
      a plurality of column touch electrodes including a first column touch electrode and a second column touch electrode, wherein the first column touch electrode and the second column touch electrode is formed at least partially of metal mesh; and
      a plurality of row touch electrodes formed at least partially of metal mesh, wherein a first row touch electrode of the plurality of row touch electrodes is formed from a plurality of touch electrode segments interconnected by a first plurality of bridges formed at least partially in a second layer different from the first layer;
   wherein a first portion of the first column touch electrode, a first portion of the second column touch electrode, or a first portion of the at least one of the plurality of touch electrode segments within the first region is formed from a transparent material;
   wherein the plurality of row touch electrodes includes a second row touch electrode formed from a second plurality of touch electrode segments interconnected by a second plurality of bridges;
   wherein the plurality of touch electrode segments includes a first touch electrode segment and a second touch electrode segment, wherein the first region is between the first touch electrode segment and the second touch electrode segment;
   wherein the second plurality of touch electrode segments includes a fourth touch electrode segment, a fifth touch electrode segment, and a sixth touch electrode segment, wherein the fourth touch electrode segment, the fifth touch electrode segment, and the sixth touch electrode segment are consecutive within the second row touch electrode; and wherein a distance between the first touch electrode segment and the second touch electrode segment is greater than a distance between the fourth touch electrode segment and the sixth touch electrode segment.

9. The touch screen of claim 8, wherein the first touch electrode segment corresponds to the first column touch electrode, the second touch electrode segment corresponds to the second column touch electrode, the fourth touch electrode segment corresponds to the first column touch electrode, the fifth touch electrode segment corresponds to the first column touch electrode and the second column touch electrode, and the sixth touch electrode segment corresponds to the second column touch electrode.

10. The touch screen of claim 8, wherein the plurality of touch electrode segments includes a third touch electrode segment, and wherein a distance across the third touch electrode segment along a horizontal axis is greater than a distance across the fifth touch electrode segment along the horizontal axis.

11. The touch screen of claim 10, wherein the third touch electrode segment corresponds to the first column touch electrode and the second column touch electrode.

12. The touch screen of claim 10, wherein the first plurality of bridges includes a first bridge between the first touch electrode segment and the third touch electrode segment and a second bridge between the second touch electrode segment and the third touch electrode segment, wherein the first bridge and the second bridge are outside the first region.

13. The touch screen of claim 12, wherein the first bridge and the second bridge together circumscribe the first region.

14. A touch-sensitive device comprising:
an energy storage device;
communication circuitry;
a touch controller; and
a touch screen comprising:
a display having an active area, the display including a plurality of light emitters configurable to display one or more images;
an optical device, different from the plurality of light emitters, in the active area at a position corresponding to a first region; and
a plurality of touch electrodes disposed in a first layer disposed over the active area of the display, wherein the plurality of touch electrodes includes:
a plurality of column touch electrodes including a first column touch electrode and a second column touch electrode, wherein the first column touch electrode and the second column touch electrode are formed at least partially of metal mesh; and
a plurality of row touch electrodes formed at least partially of metal mesh, wherein a first row touch electrode of the plurality of row touch electrodes is formed from a plurality of touch electrode segments interconnected by a first plurality of bridges formed at least partially in a second layer different from the first layer;
wherein a distance between two segments of the plurality of touch electrode segments is greater than a distance between two non-consecutive segments of a second plurality of touch electrode segments of a second row touch electrode of the plurality of row touch electrodes, wherein the two segments of the plurality of touch electrode segments are separated by one or fewer intervening segments.

15. The touch-sensitive device of claim 14, wherein a first portion of the first column touch electrode, a first portion of the second column touch electrode, or a first portion of the at least one of the plurality of touch electrode segments within the first region is formed from a transparent material and is patterned with a first pattern.

16. The touch-sensitive device of claim 15, wherein a second portion of the first column touch electrode, a second portion of the second column touch electrode, or a second portion of the at least one of the plurality of touch electrode segments outside the first region is formed from the metal mesh patterned with the first pattern.

17. The touch-sensitive device of claim 14, wherein a first portion of the first column touch electrode, a first portion of the second column touch electrode, or a first portion of the at least one of the plurality of touch electrode segments within the first region is formed from a transparent material and is solid.

18. The touch-sensitive device of claim 14, wherein a first portion of the first column touch electrode, a first portion of the second column touch electrode, or a first portion of the at least one of the plurality of touch electrode segments within the first region is disposed in the second layer or a third layer different from the first layer and the second layer.

19. The touch-sensitive device of claim 18, wherein the first portion of the first column touch electrode disposed in the second layer or the third layer is coupled to a second portion of the first column touch electrode outside the first region using a first via, the first portion of the second column touch electrode disposed in the second layer or the third layer is coupled to a second portion of the second column touch electrode outside the first region using a second via, or the first portion of the at least one of the plurality of touch electrode segments disposed in the second layer or the third layer is coupled to a second portion of the at least one of the plurality of touch electrode segments outside the first region using a third via.

20. The touch-sensitive device of claim 14, wherein the second plurality of touch electrode segments is interconnected by a second plurality of bridges;
wherein the two segments of the plurality of touch electrode segments includes a first touch electrode segment and a second touch electrode segment, wherein the first region is between the first touch electrode segment and the second touch electrode segment;
wherein the second plurality of touch electrode segments includes a fourth touch electrode segment, a fifth touch electrode segment, and a sixth touch electrode segment, wherein the fourth touch electrode segment, the fifth touch electrode segment, and the sixth touch electrode segment are consecutive within the second row touch electrode; and
wherein the two non-consecutive segments of the second plurality of touch electrode segments of the second row touch electrode correspond to the fourth touch electrode segment and the sixth touch electrode segment.

* * * * *